(12) United States Patent
Bermundo et al.

(10) Patent No.: US 11,586,402 B2
(45) Date of Patent: Feb. 21, 2023

(54) CONTEXTUAL FEATURES AND SETTINGS THEREOF FOR A PRINTING DEVICE

(71) Applicant: KYOCERA Document Solutions Inc., Osaka (JP)

(72) Inventors: Neil-Paul Payoyo Bermundo, Glendora, CA (US); Mohamed El Sayed Mostafa, Hawthorne, CA (US); Steve A. Doria, Los Angeles, CA (US); Keizen Kanazawa, Torrance, CA (US); Taku Matsuo, Los Angeles, CA (US); John Han, Glendale, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 153 days.

(21) Appl. No.: 17/225,879

(22) Filed: Apr. 8, 2021

(65) Prior Publication Data

US 2022/0326893 A1 Oct. 13, 2022

(51) Int. Cl.
*G06F 3/12* (2006.01)
*G06N 20/00* (2019.01)
*H04N 1/00* (2006.01)
*G06F 21/10* (2013.01)

(52) U.S. Cl.
CPC .......... *G06F 3/1238* (2013.01); *G06F 3/1204* (2013.01); *G06F 3/1222* (2013.01); *G06F 3/1225* (2013.01); *G06F 21/10* (2013.01); *G06N 20/00* (2019.01); *H04N 1/00506* (2013.01); *H04N 1/00514* (2013.01)

(58) Field of Classification Search
None
See application file for complete search history.

(56) References Cited

U.S. PATENT DOCUMENTS

| 7,735,091 | B2 | 6/2010 | Aaron |
| 8,004,702 | B2 | 8/2011 | Noda |
| 8,214,394 | B2 | 7/2012 | Krishnaprasad et al. |
| 10,154,163 | B2 * | 12/2018 | Larsson .................. B41J 29/38 |
| 10,175,668 | B2 | 1/2019 | Fadell et al. |
| 2003/0200371 | A1 * | 10/2003 | Abujbara ................ G06F 9/451 710/305 |
| 2022/0308902 | A1 * | 9/2022 | Tormasov ............... G06F 9/451 |

FOREIGN PATENT DOCUMENTS

CN 113254119 A * 8/2021

OTHER PUBLICATIONS

English translation of CN-113254119-A. (Year: 2021).*

* cited by examiner

*Primary Examiner* — Thomas D Lee
(74) *Attorney, Agent, or Firm* — W. Webostad

(57) ABSTRACT

Systems and methods relate generally to contextual features for a printing device. In an example method thereof, features of a printing device configuration are queried by a firmware service. The features obtained by a first dynamic scheduling service associated with the printing device are packaged. The features packaged are retrieved to provide a features list thereof by a second dynamic scheduling service for a driver associated with the printing device. Dynamic scheduling data is generated by an artificial intelligence service including deactivating one or more of the features responsive to a policy. The generating of the dynamic scheduling data includes filtering the features using the policy by the artificial intelligence service. A dynamic user interface is created by the second dynamic scheduling service responsive to the dynamic scheduling data.

20 Claims, 10 Drawing Sheets

| Time Period 169 | | Feature/Setting 164 | Activate/ Deactivate 165 | User Account(s) 166 |
|---|---|---|---|---|
| Start Time 162 | End Time 163 | | | |
| start data | end data | identifier data | show/hide data | account data |

CONTEXTUAL FEATURES AND SETTINGS THEREOF FOR A PRINTING DEVICE

FIELD

The following description relates to a printing device. More particularly, the following description relates to contextual features and settings thereof for a printing device.

BACKGROUND

Conventionally, in office and production printers, features and/or settings are immediately available based on factory set defaults. A printer, such as a multi-function printer ("MFP"), a production printer, or a personal printer, come pre-configured with a configuration programmed into such device during via printer firmware. When such a printer is turned ON, its user interface or device panel conventionally shows its initial configuration as pre-defined, such as from a factory.

SUMMARY

In accordance with one or more below described examples, a method relating generally to contextual features for a printing device is disclosed. In such a method, features of a printing device configuration are queried by a firmware service. The features obtained by a first dynamic scheduling service associated with the printing device are packaged. The features packaged are retrieved to provide a features list thereof by a second dynamic scheduling service for a driver associated with the printing device. Dynamic scheduling data is generated by an artificial intelligence service including deactivating one or more of the features responsive to a policy. The generating of the dynamic scheduling data includes filtering the features using the policy by the artificial intelligence service. A dynamic user interface is created by the second dynamic scheduling service responsive to the dynamic scheduling data.

In accordance with one or more below described examples, a system relating generally to contextual features for a printing device is disclosed. In such a system, a printing device is configured with associated features, a firmware service, and a first dynamic scheduling service. A server computer having an artificial intelligence service is configured for communication with the firmware service and the first dynamic scheduling service. A client computer has a second dynamic scheduling service configured for communication with the first dynamic scheduling service and the artificial intelligence service. The first dynamic scheduling service is configured to provide a package of the features. The second dynamic scheduling service is configured to provide a features list from the package for a driver associated with the printing device. The artificial intelligence service is configured to generate dynamic scheduling data including deactivating one or more of the features responsive to a policy. The artificial intelligence service is configured to filter the features based on the policy to generate dynamic scheduling data. The second dynamic scheduling service is configured to create a dynamic user interface responsive to the dynamic scheduling data.

In accordance with one or more below described examples, another method relating generally to contextual features for a printing device is disclosed. In such a method, features of a printing device configuration are queried by a firmware service. The features obtained are packaged by a first dynamic scheduling service associated with the printing device. The features packaged are retrieved to provide a features list thereof by a second dynamic scheduling service for a driver associated with the printing device. Dynamic scheduling data is generated by an artificial intelligence service including deactivating one or more of the features responsive to a policy. The generating of the dynamic scheduling data includes filtering the features based on the policy by the artificial intelligence service. The second dynamic scheduling service determines whether a dynamic user interface is either stored or is to be created from a default layout.

Other features will be recognized from consideration of the Detailed Description and Claims, which follow.

BRIEF DESCRIPTION OF THE DRAWINGS

Accompanying drawings show exemplary apparatus(es) and/or method(s). However, the accompanying drawings should not be taken to limit the scope of the claims, but are for explanation and understanding only.

FIG. 1-2 is a block diagram depicting an example of a dynamic scheduling service ("DSS") system.

FIG. 1-3 is a table diagram depicting an example of a dynamic scheduling data structure.

FIG. 2-1 is a flow diagram depicting an example of a user system flow.

FIG. 2-2 is a flow diagram depicting an example of an optional artificial intelligence-assisted ("AI-assisted") user system flow.

FIG. 3-1 is a flow diagram depicting an example of an AI-assisted licensing enforcement flow.

FIG. 3-2 is a flow diagram depicting an example of a DSS firmware flow.

DETAILED DESCRIPTION

Figure 1:
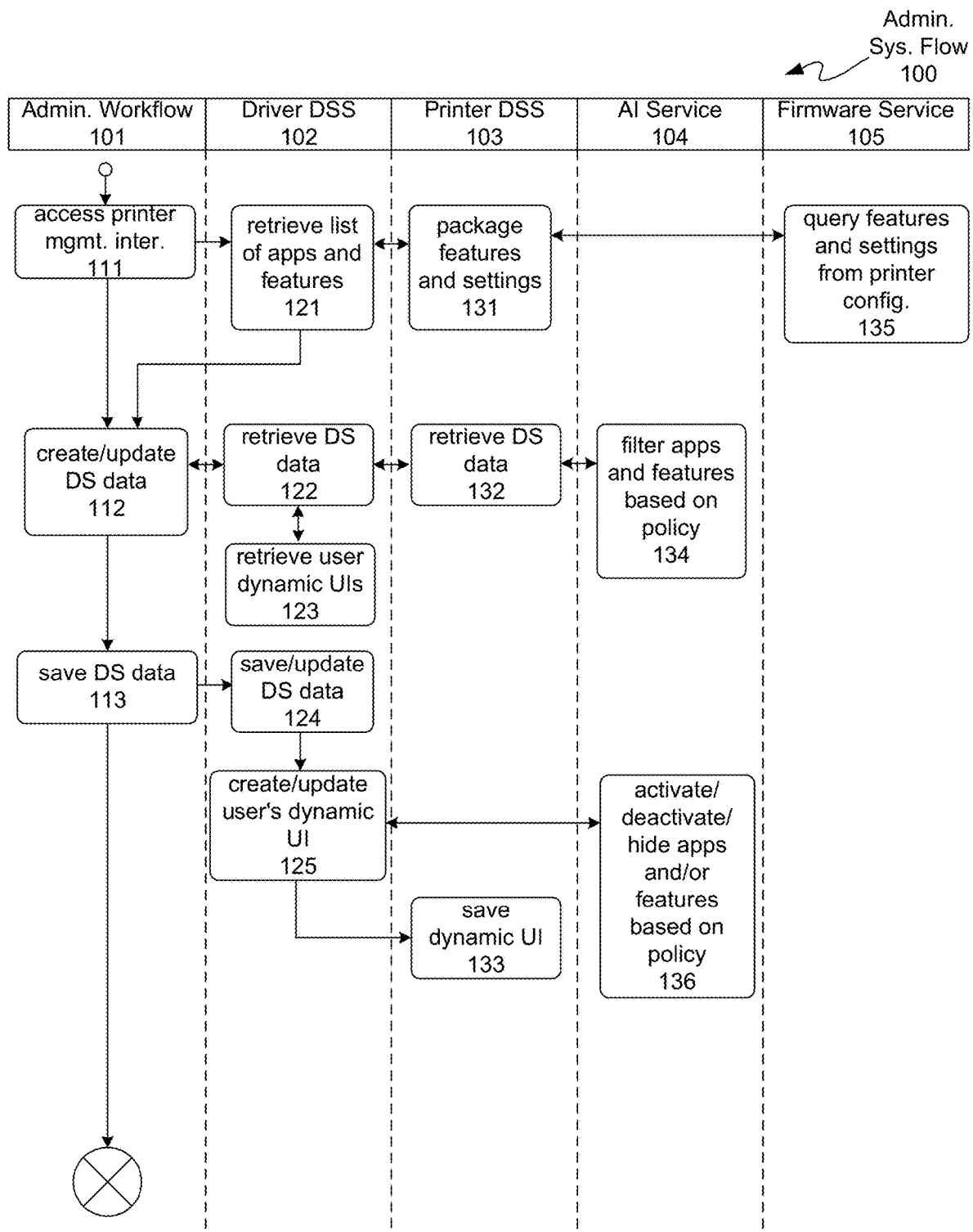
FIG. 1-1 is a flow diagram depicting an example of an administrator system flow.

In the following description, numerous specific details are set forth to provide a more thorough description of the specific examples described herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same number labels are used in different diagrams to refer to the same items; however, in alternative examples the items may be different.

Exemplary apparatus(es) and/or method(s) are described herein. It should be understood that the word "exemplary" is used herein to mean "serving as an example, instance, or illustration." Any example or feature described herein as "exemplary" is not necessarily to be construed as preferred or advantageous over other examples or features.

Before describing the examples illustratively depicted in the several figures, a general introduction is provided to further understanding.

Generally, in office and production printers, users and/or administrators may set "configurations" that can take effect during use of a device, whether for printing, job storage, scanning, or other function of a printing device. For example, there can be: session-specific configuration (i.e., per printing job for example); default configuration, which takes effect each launch of a printer driver for an associated printing device; or default configuration a single user or all users of a computer system.

Users or administrators may be able see or access all features and/or settings in a user interface of a printing device. Users may select specific setting for each feature, such as for example page media size, color mode, duplex mode, and/or other features. Generally, a printing device "feature" is configurable. Examples of printing device features may include one or more of "PageMediaSize," "Color Mode," "Duplex," "Stapling," or "PunchHole," among others. Generally, a printing device setting is a selected value or state for an associated or corresponding feature, such as for example "A4" or "Letter" for Page Media Size, or duplex for "Duplex", or "On" for PunchHole. Along those lines, features may be paired or otherwise associated with one or more corresponding settings (hereinafter "pairings" for purposes of clarity and not limitation). A set or list of such pairings may identify a configuration of a printing device for either a print session or job or as a default configuration, with the latter being for feature-setting pairings saved as default configuration.

Furthermore, there may be device dependent configurations. For example, office and production printers may be capable of including finishing devices or units. Finishing devices or units can be attached to a main printing device or unit and can be detected by such main printing unit. When a finishing device is detached, such a finishing device or unit may be detected as not being installed. Depending on whether a finishing device or unit is installed (attached) or not (detached), a feature associated with it may be reflected in a user interface of a printing device. For example, a booklet finisher may be attached or detached from a printing device, and if installed, booklet finishing settings may be in a printer driver and shown in a printer front panel, a printer's web management page, and/or a mobile application in communication with such a printing device. When a finishing unit or other optional device is detached from a printing device, associated features and/or setting may either be hidden or disabled (grayed-out). In another example, an entire feature may be hidden or disabled. Other finishing features such as stapling units, punch hole units, folding units, and/or stitching units, among others.

Generally, features and/or settings are pre-determined. Once available, such features and/or settings are visible and available for use. Generally, some features and/or settings may only appear or disappear depending on the presence or not of a hardware component, such as in the above example with reference to a finishing device. If a finishing device is attached for a day, week or month, corresponding features and/or settings may be visible in a user interface or device panel for the same period.

In an office environment or production printing shop, there can be a desire to conserve resources such as ink, electricity, and/or supplies for finishing devices, such as staples or glue, to name a few. Additionally, there can be schedules or times to hide or show certain features or settings, such as color mode, media types, paper sizes, printing quality, and/or other flexible usage contexts. While there can be power and ink saving modes for example, generally features and/or settings are available in a user interface for any permitted user with no time constraint on usage of features and/or settings.

As described below in additional detail, by adding dynamic scheduling of features and/or settings for a printing device, features and/or settings may be tailored to usage context. Dynamic scheduling can address situations where users can use printer features and/or settings at certain times of the day and/or days of the week. Along those lines, users can perform critical business tasks and be productive at certain times of the day, and then help conserve on the use of resources at other times of the day. By disabling or hiding certain features and/or settings at certain times or certain days, users may be directed to avoid misusing printer devices and resources.

By adding a time factor in scheduling of features and/or settings in printing devices, resources may be conserved. Furthermore, life of printing devices and finishing devices may be prolonged, and there may be less maintenance. Scheduling can be made flexible and can be dynamically managed and updated by managers and administrators.

In this regard, a dynamic user interface or dynamic UI is described below. A dynamic UI may be generally thought of as being contextual with respect to applications and associated features, where "context" refers to either or both one or more policies or time/schedule, on which availability of settings and/or features to a user or group of users of a printing device may be made dependent upon. For example, depending on policy or time, a contextual or dynamic UI may be modified. Along those lines, depending on context for a user, they might see an adaptable or adapting UI to them and their schedule. For purposes of clarity by way of example and not limitation, a dynamic UI is described below.

With the above general understanding borne in mind, various configurations for dynamic scheduling, and methods therefor, for printing devices are described below.

Reference will now be made in detail to examples which are illustrated in the accompanying drawings. In the following detailed description, numerous specific details are set forth in order to provide a thorough understanding of the following described implementation examples. It should be apparent, however, to one skilled in the art, that the implementation examples described below may be practiced without all the specific details given below. Moreover, the example implementations are not intended to be exhaustive or to limit scope of this disclosure to the precise forms disclosed, and modifications and variations are possible in light of the following teachings or may be acquired from practicing one or more of the teachings hereof. The implementation examples were chosen and described in order to best explain principles and practical applications of the teachings hereof to enable others skilled in the art to utilize one or more of such teachings in various implementation examples and with various modifications as are suited to the particular use contemplated. In other instances, well-known methods, procedures, components, circuits, and/or networks have not been described in detail so as not to unnecessarily obscure the described implementation examples.

For purposes of explanation, specific nomenclature is set forth to provide a thorough understanding of the various concepts disclosed herein. However, the terminology used herein is for the purpose of describing particular examples only and is not intended to be limiting. As used herein, the singular forms "a", "an" and "the" are intended to include the plural forms as well, unless the context clearly indicates otherwise. As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. It will also be understood that the term "and/or" as used herein refers to and encompasses any and all possible combinations of one or more of the associated listed items. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof. It will also be understood that, although the terms first, second, etc. may be used herein to describe various elements, these elements should not be limited by these terms, as these terms are only used to distinguish one element from another.

Some portions of the detailed descriptions that follow are presented in terms of algorithms and symbolic representations of operations on data bits, including within a register or a memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those involving physical manipulations of physical quantities. Usually, though not necessarily, these quantities take the form of optical, electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers or memories into other data similarly represented as physical quantities within the computer system memories or registers or other such information storage, transmission or display devices.

Concepts described herein may be embodied as apparatus, method, system, or computer program product. Accordingly, one or more of such implementation examples may take the form of an entirely hardware implementation example, an entirely software implementation example (including firmware, resident software, and micro-code, among others) or an implementation example combining software and hardware, and for clarity any and all of these implementation examples may generally be referred to herein as a "circuit," "module," "system," or other suitable terms. Furthermore, such implementation examples may be of the form of a computer program product on a computer-usable storage medium having computer-usable program code in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory ("RAM"), a read-only memory ("ROM"), an erasable programmable read-only memory ("EPROM" or Flash memory), an optical fiber, a portable compact disc read-only memory ("CD-ROM"), an optical storage device, a transmission media such as those supporting the Internet or an intranet, or a magnetic storage device. The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency ("RF") or other means. For purposes of clarity by way of example and not limitation, the latter types of media are generally referred to as transitory signal bearing media, and the former types of media are generally referred to as non-transitory signal bearing media.

Computer program code for carrying out operations in accordance with concepts described herein may be written in an object-oriented programming language such as Java, Smalltalk, C++ or the like. However, the computer program code for carrying out such operations may be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network ("LAN") or a wide area network ("WAN"), or the connection may be made to an external computer (for example, through the Internet using an Internet Service Provider).

Systems and methods described herein may relate to an apparatus for performing the operations associated therewith. This apparatus may be specially constructed for the purposes identified, or it may include a general-purpose computer selectively activated or reconfigured by a computer program stored in the computer.

Notwithstanding, the algorithms and displays presented herein are not inherently related to any particular computer or other apparatus. Various general-purpose systems may be used with programs in accordance with the teachings herein, or it may prove convenient to construct a more specialized apparatus to perform the operations. In addition, even if the following description is with reference to a programming language, it should be appreciated that any of a variety of programming languages may be used to implement the teachings as described herein.

One or more examples are described below with reference to flowchart illustrations and/or block diagrams of methods, apparatus (including systems) and computer program products. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the Figures illustrate the architecture, functionality, and operation of possible implementations of apparatuses (including systems), methods and computer program products according to various implementation examples. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

It should be understood that although the flow charts provided herein show a specific order of operations, it is understood that the order of these operations may differ from what is depicted. Also, two or more operations may be performed concurrently or with partial concurrence. Such variation will depend on the software and hardware systems chosen and on designer choice. It is understood that all such variations are within the scope of the disclosure. Likewise, software and web implementations may be accomplished with standard programming techniques with rule-based logic and other logic to accomplish the various database searching operations, correlation operations, comparison operations and decision operations. It should also be understood that the word "component" as used herein is intended to encompass implementations using one or more lines of software code, and/or hardware implementations, and/or equipment for receiving manual inputs.

FIG. 1-1 is a flow diagram depicting an example of an administrator system flow 100. Administrator system flow 100 may include an administrator workflow 101, a driver dynamic scheduling service ("driver DSS") 102, a printing device dynamic scheduling service ("printer DSS") 103, an artificial intelligence (AI")" service 104, and a printer firmware service ("firmware service") 105.

Figures 1, 2, 3:
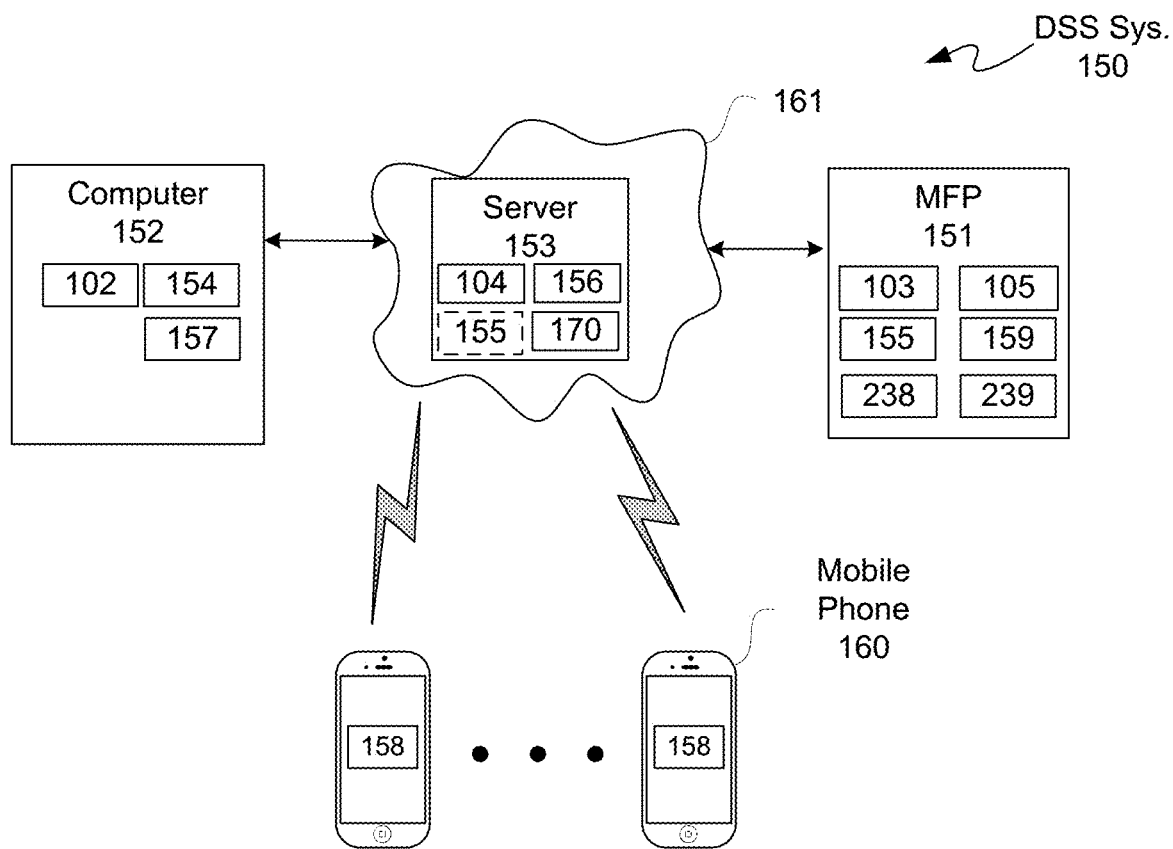
Figures 1, 2:
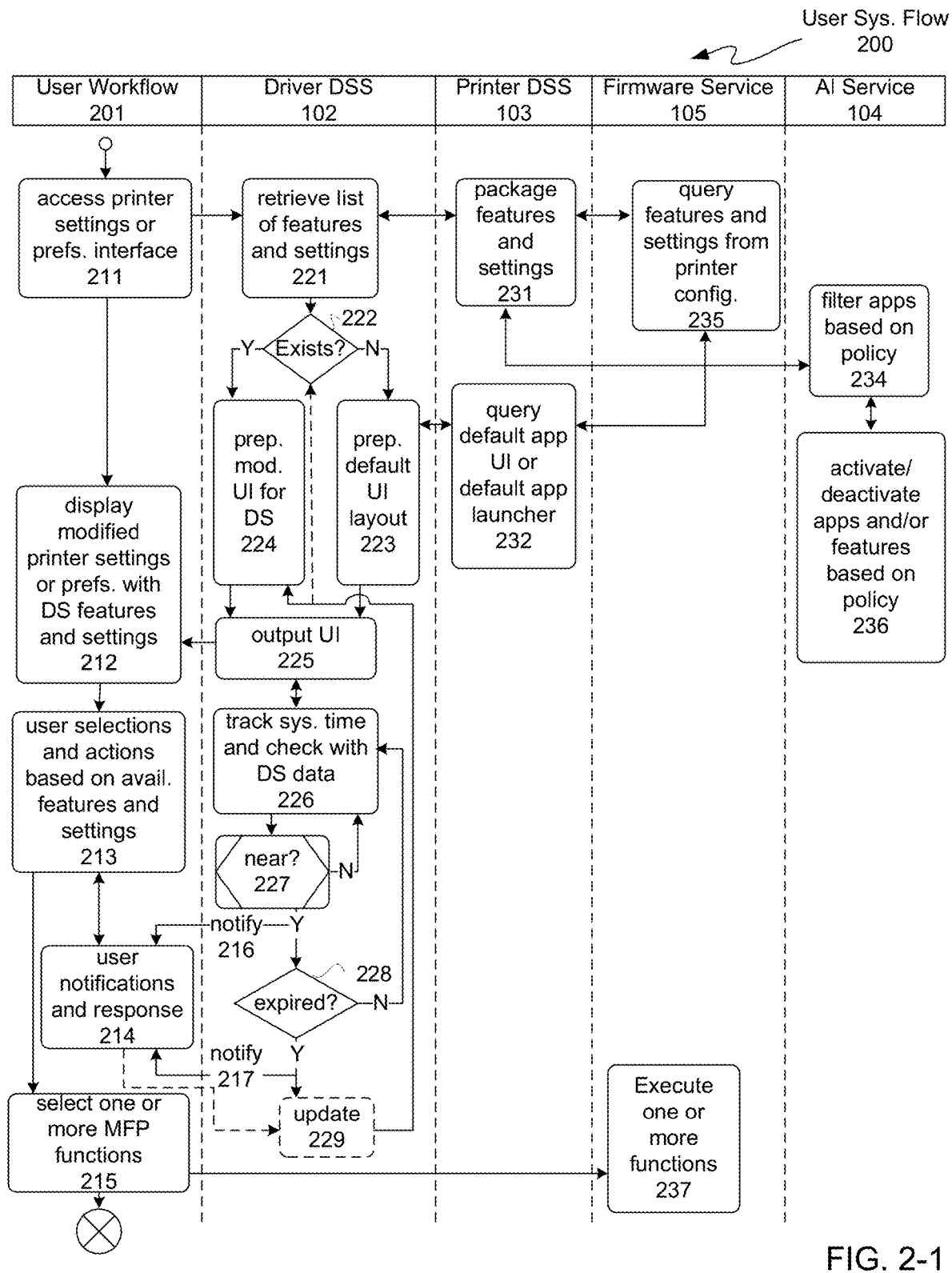
Figure 2:
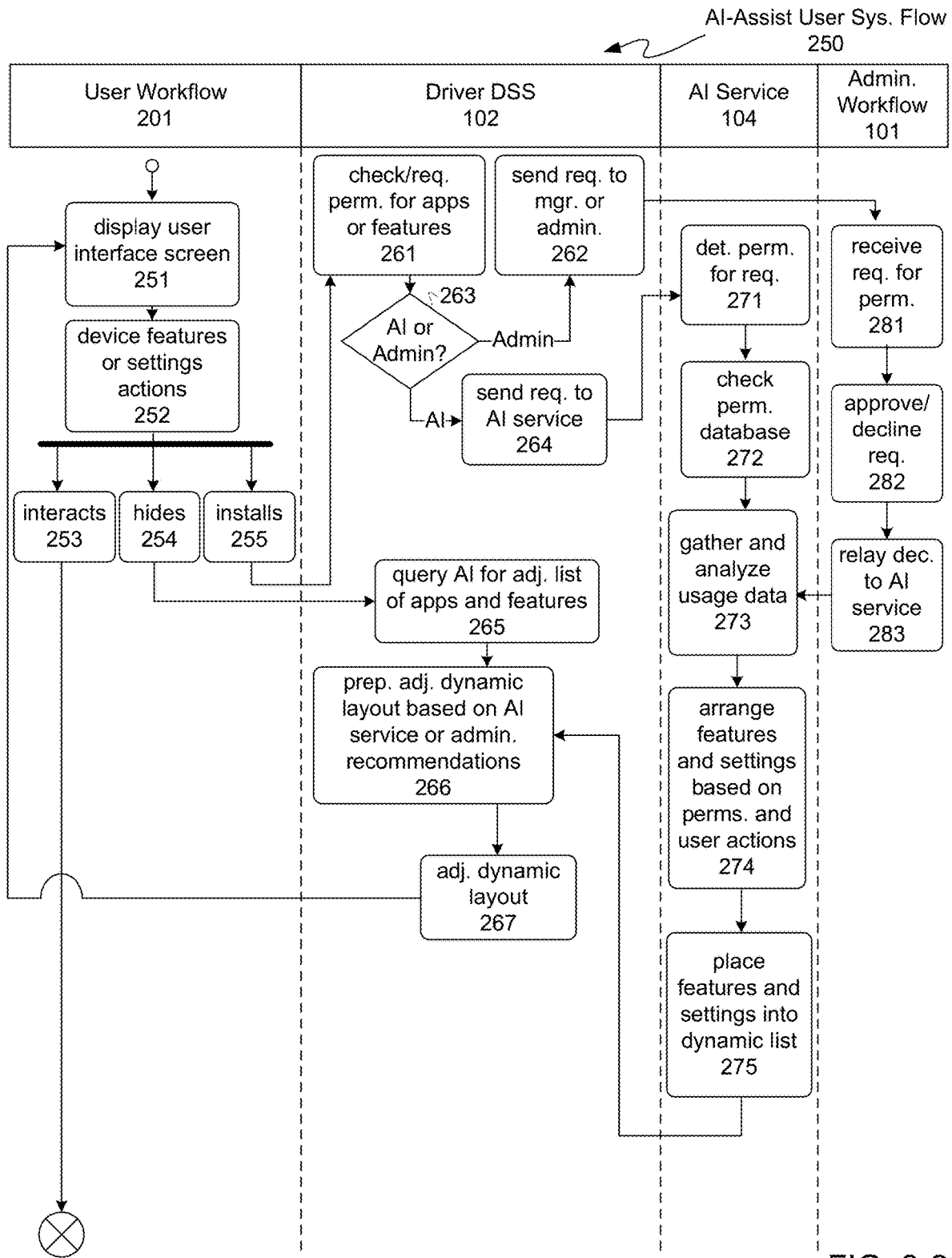
Figures 1, 3:
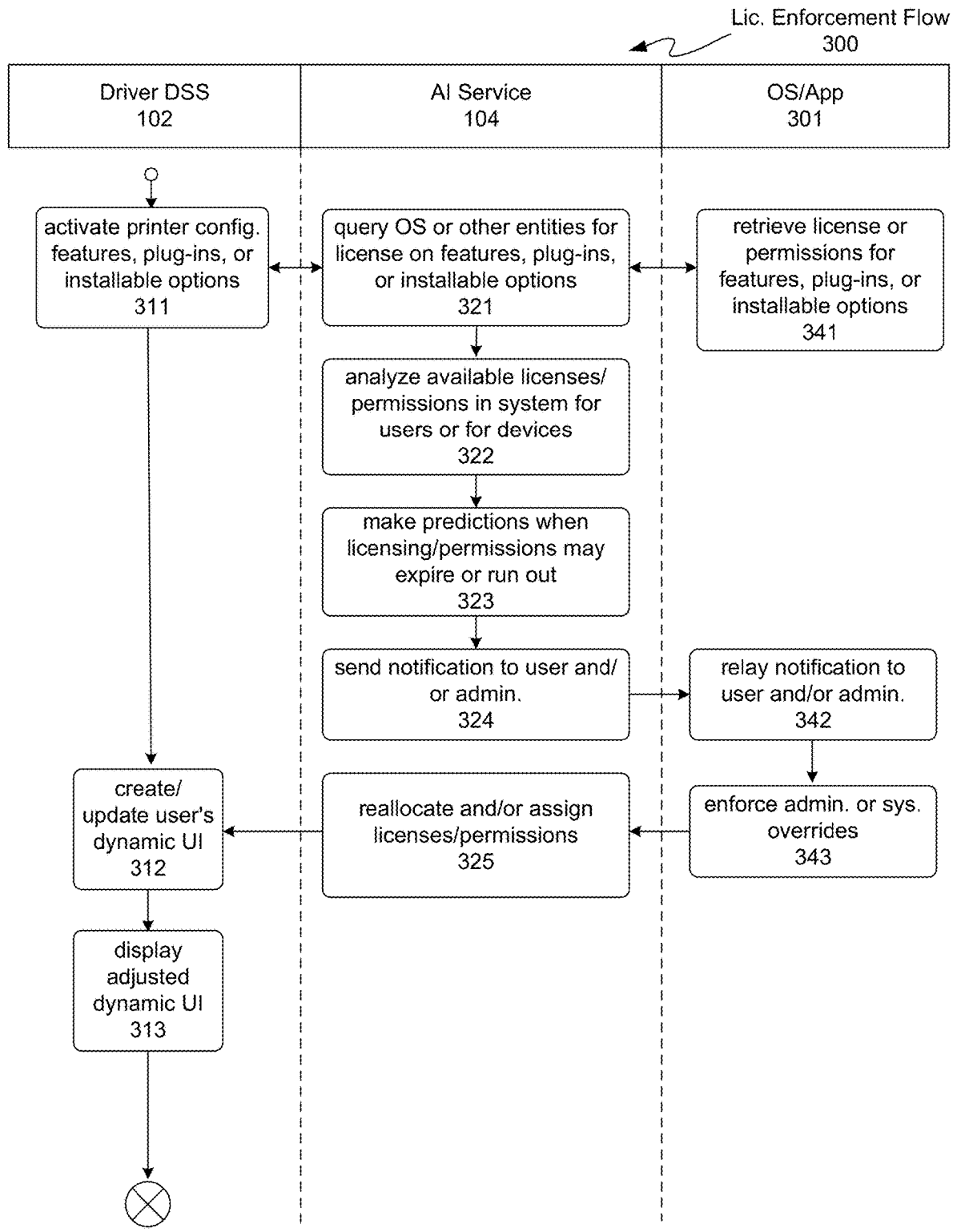
Figures 2, 3:
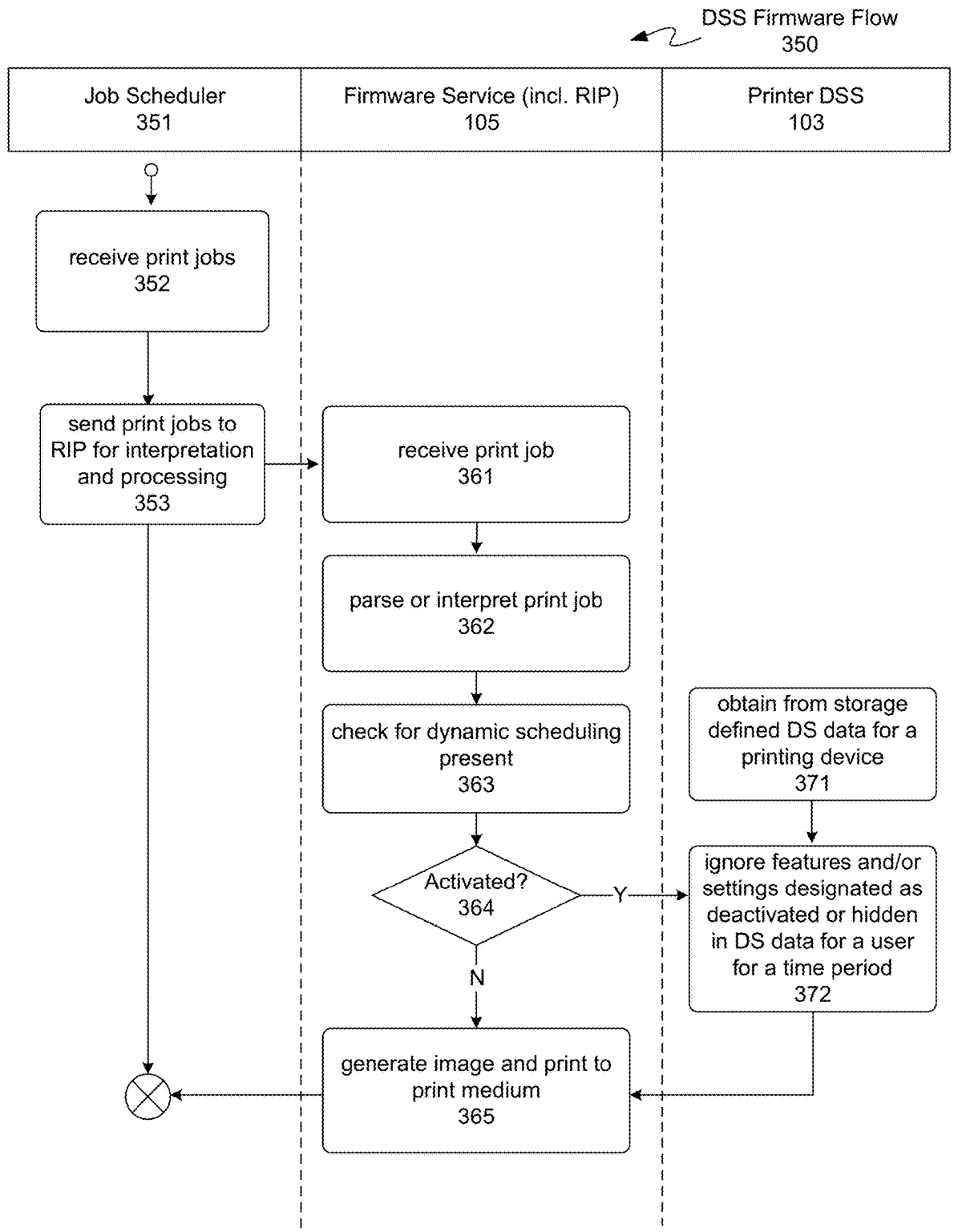

FIG. 1-2 is a block diagram depicting an example of a DSS system 150. As administrator system flow 100 may be implemented in a DSS system 150, administrator system flow 100 and DSS system 150 are described in further detail with simultaneous reference to FIGS. 1-1 and 1-2.

Driver DSS 102 may be for a printer driver hosted in a computer, mobile device, web page server, printing device, or other printer driver hosting device. For purposes of clarity by way of example and not limitation, it is assumed that a printing device is an MFP 151 and that a driver DSS 102 host is a notebook computer ("client computer" or "computer") 152; however, other types of printing devices and/or driver DSS hosts may be used in accordance with the following description.

In this example, printer DSS 103 is hosted in MFP 151 along with printer firmware 105. Code for AI service 104 may be hosted in the same host of driver DSS 102 or printer DSS 103. However, in this example, AI service 104 is hosted in a cloud-based network server 153 to provide such AI service 104.

With reference to administrator workflow 101, an administrator, which may be an individual or AI service 104, may access a printer management interface 154 at operation 111. Printer management interface 154 may be hosted in a computer, mobile device, web page server, printing device, or other printer driver hosting device. In this example, printer management interface 154 is hosted along with driver DSS 102 in computer 152.

From operation 111, at operation 112 of administrator workflow 101 dynamic scheduling ("DS") data may be updated or created, as described below in additional detail, by an administrator. At operation 113 of administrator workflow, DS data created and/or updated at operation 112 may be saved, such as in memory of computer 152.

As described below in additional detail, dynamic scheduling is disclosed for when certain features and/or settings may be shown or be visible in a user interface or display panel of an MFP 151, such as based on time of day, day of week, week of month, month of a year, or other time periods as may be defined. However, features and/or settings are not hidden or excluded based on whether an actual hardware component, such as for example finishing device, is attached or not in or to a main unit of MFP 151. That capability exists and is a known behavior in printers, particularly MFPs and production printers. Instead, keeping track of one or more defined time-periods (whether certain times of day, day of week, week of a month, month of a year, or other time-periods that may be defined) to show or hide one or more associated or selected features or settings as defined in a "dynamic schedule."

Generally, DS data refers to a set of data that defines how a feature or setting may be handled in MFP 151. For example, a set of data may consist of "setting-value" pairs, an action (show, hide, disable (gray-out)), and time periods (times within a day, day in a week, and/or weeks in a month, among others). There can be any number of such sets of data to cover one or more targeted features or settings that can be conserved by DS of MFP 151. For example, there can be a set of data for ink resources, another set of data for color mode, another set of data for each finishing device, and/or another set of data for electricity or power saving, among others.

Generally, dynamic schedule refers to defining one or more time periods when one or more associated features and/or settings can be acted upon with MFP 151, and inferentially one or more corresponding time periods when one or more associated features and/or settings cannot be acted upon with MFP 151. A dynamic schedule can be defined and re-configured, such as for example at any configuration time, by an administrator, manager, or privileged user. Accordingly, use of "dynamic" herein is not based on actual presence of hardware components but dependent on scheduling of one or more times to affect a user interface.

Computer 152 may host a DS management interface 157. DS management interface 157 may be an administrator UI to allow same to be able to create DS data, or to be able to modify or update existing DS data for at least one user account at operation 112. Furthermore, an outcome of operation, namely DS data, may be used to create a user-specific dynamic UI, as described below in additional detail.

Creation of DS data may be done by an admin (e.g., regular administrator, manager, or privileged or power user). An admin may define DS data that may be assigned or associated with users of a device. An admin may do this in a connected device such as a mobile phone, tablet, laptop, or computer that has a service or an application that may show a DS management interface 157.

DS data in a DS data structure 155 may be saved in local storage in an MFP. In another example, DS data of DS data structure 155 may be stored in a shared network device or in the cloud.

For purposes of clarity by way of example and not limitation, FIG. 1-3 is a table diagram depicting an example of a DS data structure 155. In this example, DS data structure 155 is a table; however, other types of data structures may be used in other examples.

In this example, a time period 169 may be defined for a start time field 162 and an end time field 163. Start data and end data may be as previously described herein. A feature/setting field 164 may be used to identify which feature and/or setting is subject to an associated time period. Activate/deactivate or activation state field 165 may store either show data or hide data, respectively. A user account(s) field 166 may be used to store account data for one or more users, or a group of users.

Based on the DS data for a user, a modified dynamic layout of a user interface may be created and shown to such user when such user next signs in onto a device. A dynamically modified layout of user interface may be provided. In an example, a user may see the same dynamic UI 158 in any MFP that such user connects to or logs in to. In other words, a dynamic UI 158 may be communicated to one or more mobile devices in communication with DS Cloud Service 161 in general, or server 153 thereof in particular.

When DS data 155 is saved in local storage, a user may experience a modified dynamic UI only for that device. If DS data 155 is on a shared network storage, a user may be provided with a unified UI for all devices in such network, such as in an office, school, home, or other local networks. If DS data structure 155 is in a cloud or other network, a same modified dynamic UI may be shown in all devices that a user uses, namely signed on at least one device using a same account that is registered in a DS Cloud Service 161.

Driver DSS 102 may interact with administrator workflow 101. At operation 121 from access at operation 111, a list of applications ("apps") and features ("features list") may be retrieved from MFP 151. As used herein, features may include one or more settings for each of such features. Moreover, as used herein, features may include one or more apps.

In this example, a driver DSS 102 is hosted in computer 152. However, as a DSS is generally a service that performs dynamic scheduling of system services of an MFP 151, where one or more of such services may be integrated features in MFP 151 firmware, generally indicated as firmware services 105, DSS may be resident in an MFP and/or a computer for example. In this example, driver DSSs are hosted in computer 152 and printer DSSs are hosted in MFP 151.

Driver DSS 102 queries or retrieves a list of features and settings, which may include associated apps, in or associated with MFP 151 at operation 121. Such listing provides a set of items that may in whole or in part be part of a dynamic schedule, where such set of items may be used to provide DS data for informing a table or other data structure used for a dynamic schedule. Again, such DS data may be created or updated at operation 112 after retrieval from operation 121.

Such a retrieved list can be packaged for presented during creation of DS data at operation 112 by an administrator. Along those lines, printer DSS 103 at operation 131 may communicate with driver DSS 102 to obtain and package such a retrieved list, such as to provide a package of features and settings. At operation 135, firmware service 105 may query such features and settings package from printer configuration firmware. Along those lines, printer DSS 103 may ask printer firmware 105 to perform such query, and printer firmware 105 may perform such query and provide results of such query to printer DSS 103 for packaging at operation 131.

Furthermore, from operation 112, an administrator may retrieve currently existing, if any, DS data for a system at operation 122. Such retrieval of DS data may be by driver DSS 102 at operation 122.

Along those lines, at operation 123, driver DSS 102 may create, prepare, or update to provide a modified layout for a user interface ("UI"). Such UIs may be created responsive to DS data, and such UIs may be stored.

At operation 123, driver DSS 102 may retrieve one or more dynamic UIs, such as from storage of computer 152. Such retrieval may be based on or responsive to DS data for a user. Driver DSS 102 may be configured to show a modified dynamic UI on a device UI when a user signs in the next time for example. Driver DSS 102 may further monitor system time and prepare and send notifications to one or more users as a scheduled time approaches or is expiring, as described below in additional detail.

For creating, preparing, or updating dynamic UIs, driver DSS 102 may cause printer DSS 103 to retrieve DS data, if any, at operation 132 via AI service 104. Printer DSS 103 may obtain such DS data from AI service 104 generated at operation 134.

AI service 104 at operation 134 may filter apps and features based on one or more policies to generate DS data. Along those lines, AI service 104 may be implemented using a policy engine 156. Examples of policies may include general, restricted, social, games, and/or other policy type or category. Furthermore, AI service 104 may have accessed to one or more databases 170 or other stores for accessing information in accordance with the description herein.

Generally, an AI service or component 104 may be configured to enforce policies for filtering of features and/or settings. Policies can be defined and established to determine which features and/or settings may be allowed for users to use. Example criteria may include one or more of the following categories. A restricted category may be used for features, plug-ins, or installable options that are not going to be allowed for use. This can include plug-ins or installable options that can inadvertently break an MFP. An office category may be used for features, plug-ins, or installable options that are for office work use. This can include for example stamping, watermarking, annotating, or signing plug-ins. A productivity category may be used for features, plug-ins, or installable options that assist users to be more productive. This can include job storage services, scanning, faxing, for example. These are just example categories, and these and/or others may be defined based on system use and purposes.

These categories may be used by AI service 104 to determine whether certain features are allowed or not allowed to be used or shown in an MFP user interface, such as front panel, connected apps, or connected devices.

Definitions for these categories may overlap, or some features, plug-ins or installable options may belong to multiple categories. Optionally, a filtered list of features may be presented to an administrator for review and final decision. An administrator override may be a configurable setting, which can be activated or deactivated. If activated, an administrator may receive a notification and be presented with a user interface that allows such administrator to allow/disallow a feature. If disabled, AI service 104 may make a determination programmatically. If a feature cannot be properly categorized, a catch-all default may be to disallow or hide such feature.

As previously indicated AI service 104 may be a cloud-based service, namely a DS cloud service. A DS cloud service may run on a local network and/or a cloud, private or public. A DS cloud service may manage storage of DS data for registered users and may provide DS data to client devices, such as MFPs, so that a user may experience a unified UI experience for compatible MFPs, such as wherever a user may sign in.

From operation 113, driver DSS 102 may be instructed to save or update DS data at operation 124. For example, DS data may be stored in network memory of server 153, such as in a form or structure of a database 170.

At operation 125, driver DSS 102 may create or update a user's dynamic UI using such DS data saved or updated operation 124. This allows each dynamic UI to be personalized to an associated user. With respect to updating a dynamic UI, at operation 125 driver DSS 102 may retrieve a previously created and store dynamic UI for such dynamic UI to be updated with current DS data, or, if no prior dynamic UI is stored for such dynamic UI to be updated, driver DSS 102 may use a default layout for creating of a dynamic UI using such current DS data.

Printer DSS 103 may save a dynamic UI of a user at operation 133. Along those lines, a library or store of dynamic UIs associated with user accounts may be stored in server 153, or optionally in MFP 151. For example, dynamic UIs may be stored in network memory of server 153, such as in a form or structure of a database 170.

Activation, deactivation, and/or hiding of apps and/or features based on policy may be controlled by AI service 104 at operation 136. Again, examples of policies may include general, restricted, social, games, and/or other policy type or category. Accordingly, a policy used at operations 134 and 136 may be a same policy. Along those lines, AI service 104 may manage a user's dynamic UI responsive to DS data of operation 124.

To recapitulate, DS of features and/or settings in an MFP networked system may be provided as a software-based tool for an administrator or other user to manage use of an MFP, its features and compatible finishing devices. With this tool, features and/or settings an MFP can be scheduled at certain times or periods that may be defined. This allows selected features and/or settings to be activated/deactivated (e.g., shown/hidden) in dynamic UIs associated with an MFP (e.g., front panel, web management page, connected mobile apps, or other).

With respect to mobile apps, mobile phones 160 may be programmed with apps. Such mobile phones 160 may be in communication with server 153. Each mobile phone of mobile phones 160 may be for a corresponding user, and server 153 may provide a user-specific dynamic UI for an associated app for each such user's phone. This allows multiple user specific dynamic UIs based on associated DS data sets, which may be different from one another, be provided to a common app distributed among multiple mobile phones, or other mobile devices. In another example, DS may be managed with a management web-page for a mobile or other computer device.

To generally recapitulate, an administrator (e.g., regular admin, manager, or privileged user) may see a DS Management Interface in a connected device (mobile phone, laptop, tablet or computer) or at a front panel of an MFP. Such admin may create and assign DS data for registered users of a system, or use default DS data applicable to all users in a group.

A DSS gathers a list of installed features, plug-ins, or installable options in a system that may be "scheduled". Such DSS may make use of operating system settings or other configuration files in installation directories. Such DSS may also make use of known default configurations for MFP 151. Such DSS may also make use of APIs to query for configurable features and settings. Such DSS may also make use of database API calls to access configurations that may be available in databases, files, network storage, or cloud storage.

Once an admin is finished creating a DS data set, such admin may opt to save such data to a system. Such system may save or update data to MFP 151 drive storage, shared network drive, or cloud storage.

Users may view dynamic layout of features and settings based on an active dynamic schedule. A dynamic layout based on DS data may be shown in connected apps in mobile devices for example. Admins can also manage a dynamic schedule in a web management page for a device. MFP 151 may provide services for management and handling of DS data 155.

FIG. 2-1 is a flow diagram depicting an example of a user system flow 200. With simultaneous reference to FIGS. 1-1 through 2-1, user system flow 200 is further described.

A user workflow 201 may include accessing a printer settings or preferences interface at operation 211, namely signing onto a device. This may include accessing such an interface in a computer, mobile device, tablet, or printer front panel for example.

At operation 212, modified printer settings or preferences may be displayed with DS features and settings previously created or updated at operation 112. At operation 213, a user may make selections or perform other actions based upon available features and settings, some of which may be dynamically scheduled. Interaction between a user and such features or settings may be subject to receipt at operation 214 of user notifications, some of which a user may respond to.

At operation 215, a user may select one or more functions of MFP 151 to be performed. Example functions may include printing, scanning, faxing, job storing, and/or other MFP functions. At operation 237, firmware service 105, along with MFP 151 hardware, may execute or perform such one or more functions selected at operation 215.

At operation 221, from operation 211, a driver DSS 102 may retrieve a list of features and settings. In other words, driver DSS 102 may retrieve a modified or dynamic UI for a user, if such a UI has been previously created and stored.

At operation 231 with operation 221, a printer DSS 103 may package features and settings for such list. At operation 235 with operation 231, a firmware service 105 may query features and settings from a printer configuration, such as from a configuration file for example, to provide a set of features and settings for packaging. As operations 221, 231, and 235 for a user correspond to operations 121, 131, and 135, respectively, for an administrator, additional details regarding operations 221, 231, and 235 are not repeated for purposes of clarity and not limitation. However, for an existing dynamic UI assigned or created for a user exists in a system, AI service 104 operations 234 and 236 may serve as a double-check or guarantee to ensure that user are only be able to see or use features allowed for their use.

However, for a user, such as a user logged onto server 153 for example, AI service 104 may filter apps based on policy at operation 234 in conjunction with operation 231. A list of policy filtered apps for example may be used to associate such apps with corresponding features and settings for packaging at operation 231. AI service 104 at operation 236 in conjunction with operation 234 may determine which apps and/or features to activate or deactivate based on policy. For example, activated apps and features may be tagged or untagged for being shown in an associated dynamic UI, while deactivated apps and features may be tagged or untagged, as applicable, for being hidden in such an associated dynamic UI. Operations 234 and 236 correspond to operations 134 and 136, but user system flow 200 as described herein. Accordingly, a package of features and settings for one or more apps may be used for generating a list, where such list is filtered based on policy and curated for activated or deactivated apps and/or features.

At operation 222 from operation 221, a driver DSS 102 may determine whether a dynamic UI exists for such list of features and settings, such as for example all or some of the apps, features and settings on such list retrieved at operation 221. If at operation 222 it is determined such a dynamic UI does not exist, such as in storage, then at operation 223 a default UI layout may be prepared or populated with such apps and/or features, as well as corresponding settings, listed on such list to provide a dynamic UI.

For example, if there is no dynamic UI found for a user, driver DSS 102 may retrieve from storage or a server hosting DS data in the cloud or network. Driver DSS 102 may query for and retrieve applicable DS data for a user. Driver DSS 102 may prepare a modified layout based on a created dynamic UI based on found DS data.

If there is no applicable dynamic UI nor DS data for a user, driver DSS 102 may prepare a UI to show a default set of features, which can be all features that are activated and shown, based on a default device configuration. For example, drive DSS 102 may show a default desktop and start menu list in Windows OS, or a default app launcher UI for Android devices. In another example, a dynamic UI may come from a dynamic app launcher 159 hosted in MFP 151 for a DSS to use as described herein.

If, however, at operation 222 it is determined such a dynamic UI does exist, then at operation 224 a modified UI for DS of features and settings, such as for apps, on such list may be prepared by a driver DSS 102. Along those lines, a dynamic UI may be retrieved from storage in response to a query at operation 222 using component on such list to provide one or more search vectors. Such a modified UI may reflect DS of features and settings for an associated user.

At operation 225, a driver DSS 102 may output for display a UI obtained from either operation 223 or 224, where such UI may be a dynamic UI according to DS data, which may be associated with a user or a group of users. Such an interactive display may be displayed at operation 212.

To prepare a default UI layout at operation 223, a driver DSS 102 at operation 223 may cause at operation 232 a printer DSS 103 to query a default app UI 238 or a default app launcher 239, such as may be hosted in MFP 151. Working with operation 232, firmware service 105 may perform a query operation as previously described to obtain a default set of features and settings from a printer's configuration, such as for MFP 151 as same may vary among printing devices. Such default set of features and settings obtained may be used to provide an initial population of a default UI layout at operation 223. A default layout may be populated with configuration data as initial DS data using default application user interface 238 or responsive to a default application launcher 239 locating and activating a stored default layout for population thereof to provide an initial dynamic user interface.

To adhere to a dynamic schedule, tracking may be used. Along those lines, from operation 225 for example, at operation 226 a driver DSS 102 may track system time and check with DS data, which DS data may be associated with a user or a group of users. Such DS data may be stored as previously described, and accessed or queried at operation 226.

At operation 227, a driver DSS 102 may issue a notification 216 to operation 214 based on a tracked system time and DS data determination that scheduled time is near expiration. A threshold amount of time remaining may be used for issuing such a notice, and other notices may periodically follow indicating an amount of time remaining. For example, a threshold amount of time may be 15 minutes or some other time, with following 10, 5, and 1 minute notices, from a scheduled expiration time. However, these and/or other amounts may be used in other examples. Operation 227 may be directly looped back to operation 226, until or unless such threshold has been reached or exceeded.

Once a threshold amount has been reached or exceeded, in addition to providing a notice, a check may be made at operation 228 by driver DSS 102 to determine if dynamically scheduled time for features and/or settings has expired. If an expiration time has not been reached as determined at operation 228, operation 228 may be looped back to operation 226.

If, however, at operation 228 it is determined a dynamic schedule time has expired, then driver DSS 102 may issue a notification 217 to operation 214 for a user. Optionally, at operation 214 a user may respond to either of notifications 216 or 217 to request a modification of DS data associated with such user for more time. If a user request more time, which may be a user selected amount or a default amount, at operation 229 driver DSS 102 in response to such request may update DS data associated with such user to reflect such an additional amount of time. Driver DSS 102 may return to operation 224 to modify a dynamic UI associated with such user to reflect such additional amount of time in embedded DS data in such dynamic UI.

In another example, once a dynamic schedule has expired, driver DSS 102 may execute and apply any changes to a current dynamic UI based on updated dynamic scheduling data at operation 229. If there is any feature that is still part of DS data, driver DSS 102 may prepare an updated dynamic UI for a user, as previously described by returning to operation 224. If there is no feature left that is controlled through dynamic scheduling, then driver DSS 102 may use a default UI layout, as previously described. In this example, driver DSS 102 may return to operation 222 after an update check at operation 229.

Once active, a dynamic schedule with its associated data may take effect for a programmed time-period. When a schedule is expiring or nearing the time when it changes state from activated to deactivated (or from shown to hidden) or vice-versa, a warning message or notification may be shown in a user interface, such as on MFP 151 front panel and/or one or more of its management interfaces (e.g., web site or connected mobile applications). Such a warning message may be sent to a user, an administrator, and/or other subscribing users (e.g., managers, team or department members) and shown on their mobile phones, computers, tablets, or the like. Once time-limit for the dynamic schedule is reached or when time has arrived, scheduling data may be executed, applied, and made to take into effect.

At the time a dynamic schedule expires, a user may be notified whether processing for a feature will be allowed to finish or will be cancelled. In another example, certain types of processing may be allowed to finish and other types of processing may be aborted. In another example, a user may be allowed to decide what happens.

For example, in order not to interrupt print jobs that are already being processed at a printer, scheduling data can be made to apply only on following or subsequent print jobs or subsequent use of such printer. In another example, an administrator may enforce strict execution and application of DS data such that it will cancel, interrupt or abort currently executing print jobs and close, cancel or abort currently open user interfaces and show updated user interface layout with applicable features and/or settings.

Along those lines, at any time during an online state of MFP 151, a dynamic UI in MFP 151 or in connected apps in mobile, tablet or computer devices can have a varying layout such that certain affected features and/or settings may become available (shown or activated) or become unavailable (hidden or deactivated). Users of MFP 151 may see only those features and/or settings allowed for them during a scheduled time-period. Having this capability may give an administrator, manager, and privileged users more granular control on management and conservation of printer and related resources.

As a user makes use of an MFP and its features, they may desire for some features that are not available in a dynamic UI created as described above. However, FIG. 2-2 is a flow diagram depicting an example of an optional AI-assisted user system flow 200. With simultaneous reference to FIGS. 1-1 through 2-2, AI-assisted user system flow 250 is further described.

AI-assisted user system flow 250 allows a user to go through an application store (e.g., MFP manufacturer's website for installable HyPAS applications) or some other sources to download one or more missing features, plug-ins, and/or installable options. A feature may further be in the form of a data or configuration file.

At operation 251 of a user workflow 201, a user interface screen may be displayed, such as after logging into a system. Such a screen may be of a mobile device, tablet, front panel, or web page on a screen for example. Such a screen display may be of a dynamic UI, as previously described.

At operation 252, a user may perform actions on device features or settings. Such actions may include interactions at 253, hides at 254, or installs at 255. With reference to interactions at 253, a user may interact with activated features or settings. With reference to hides at 254, a user may hide one or more features, settings, and/or plugins. With reference to installs at 255, a user may install one or more features or plug-ins.

If a user decides to hide a feature for example at operation 254, in response AI service 104 may be queried at operation 265 by driver DSS 102. AI service 104 may be queried to adjust a list of applications and features. In this example, a feature on such list may be adjusted by hiding same. At operation 266, an adjusted dynamic layout may be prepared by a driver DSS 102. Such preparation may be based on AI service 104 or administrator recommendations, such as a dynamic list as described elsewhere herein. Along those lines, a DSS may intercept or detect a request, such as to hide a feature in this example, and such DSS may get permission from either an administrator or automatically from AI service 104. Whether a manual or automatic permission request is made may be a configurable option in a DSS system as described herein with respect to installation of a feature or plug-in at operation 255.

At operation 261 from a request initiated at 255, driver DSS 102 may check for permission or request permission for such one or more apps and/or features to be installed. At operation 263, in this example it may be determined whether such check or request is to go through an administrator, such as a human, or AI service 104. If such request is to go to an administrator as determined at operation 263, then at operation 262 driver DSS 102 sends a request for installation to a manager or administrator, generally to administrator workflow 101 starting at operation 281. If, however, such request is to go to AI service 104 as determined at operation 263, then at operation 264 driver DSS 102 sends a request for installation to AI service 104 starting at operation 271.

At operation 271, AI service 104 may determine whether permission for a requested feature, setting or plug-in is warranted. For example, AI service 104 may either approve or decline a request for download or activation of a hidden or disabled feature, based on policies established for a DSS system. AI service 104 may determine whether a proposed feature for example to be downloaded belongs to some defined categories. At operation 272, AI service 104 may check a permissions database. A permissions data base may be used to determine if a proposed feature for example is allowed or not. At operation 272, AI service 104 may further filter plug-ins, data, or configurations that a user is requesting.

At operation 273, AI service 104 may gather and analyze usage data. Such usage data gathered and analyzed may be for features associated with corresponding permissions. For example, AI service 273 may gather data for what feature(s) were allowed or declined, how often such feature(s) were allowed, how frequent a user makes such requests, and other such data indicators to determine what features are frequently allowed/declined, frequently requested, and frequently used, among other considerations. The first time a feature is allowed, such feature may be assigned to a low-priority classification. Such low-priority features may be shown in a list in a dynamic UI. Such low-priority feature(s) may not be in a start-up page, home page, or start menu, for example. Instead, such low-priority features may be shown in some extra tab, extra menu, or extra page that a user may not necessarily see whenever a user initially starts a device.

As a user uses some features more and more, those features may be reclassified by AI service 104 as "frequently-used" items. Such "frequently-used" items may be shown higher in a dynamic UI features list, highlighted in a dynamic UI, or shown in a "frequently-used" start menu entry, tab, or page in a dynamic UI. Other classifications in a permissions database can be "always permitted", "frequently-used", "low-priority", "single exception" (or prompt every time), or "always declined", and such classifications may be associated with corresponding features as stored in a permissions database of databases 170.

At some point when user makes frequent request for features and is always granted permission, in an example, such features may be classified as "always permitted". That way, after some time, a user may eventually always see those features. In another example, an administrator may give permission to request and make such features always permitted or always declined, where "declined" means that all future user requests for those features likewise may always not be allowed.

At operation 281, an administrator for administrator workflow 101 may receive a request for permission to install a feature. At operation 282, an administrator may approve or decline such a request. At operation 283, a decision either to approve or decline a request to install a feature may be relayed to AI service 104. AI service 104 may receive such information at operation 273, as part of a data gathering operation.

At operation 274, AI service 104 may arrange features and settings based on permissions and user actions, where user actions are defined by usage data therefor. Such arrangement may for example be as previously described with respect to priority or frequency of use; however, other types of arrangements may be used.

At operation 275, such features and settings may be placed into a dynamic list for a dynamic UI. Again, for example such placement may be always permitted, frequently used, low priority, single exception, and/or other placement categorization.

Input from AI service 104 output from operation 275 may be used at operation 266. Again, at operation 266, an adjusted dynamic layout may be prepared by a driver DSS 102 based on AI service 104 recommendations, which may include a dynamic list.

At operation 267, such a dynamic layout may be adjusted for an updated dynamic UI. In other words, an adjustable layout of a current dynamic UI may be adjusted by a driver DSS 102 responsive to a dynamic list obtained from AI service 104. Such updated dynamic UI may be provided to a user display screen for viewing by a user as part of user workflow 201 at operation 251. In other words, driver DSS 102 may adjust a dynamic UI and re-display or display such updated dynamic UI for a user to see and use.

FIG. 3-1 is a flow diagram depicting an example of an AI-assisted licensing enforcement flow 300. Because AI service or component 104 has capabilities of analyzing features and usage thereof, such capabilities can be used to analyze, monitor, and enforce licensing requirements, if present, of such features in a DSS system, as described herein, including for an MFP. Accordingly, AI-assisted licensing enforcement flow 300 is further described with simultaneous reference to FIGS. 1-1 through 3-1.

As AI service 104 analyzes usage of features in MFP 151 or associated with MFP 151, AI service 104 may obtain information about the number of permitted features and/or devices that are active in an associated DSS environment. This positions AI service 104 to monitor availability of valid licenses for such features and/or devices.

At operation 311, a driver DSS 102 may activate MFP 151 configurable features, plug-ins, or installable options. At operation 312, DSS 102 may create or update a user's dynamic UI based on licenses or permissions. At operation 313, an adjusted or updated dynamic UI may be output for display or displayed.

Operation 311 may work or communicate with operation 321 of AI service 104. Operation 321 may query an OS or one or more other software entities for licenses on features, plug-ins or installable options. At operation 341, an OS or app 301 may work with AI service 104 at operation 321. At operation 341, an OS or app 301 may retrieve licenses or permissions for such features, plug-ins or installable options.

At operation 322, AI service 104 may analyze such available licenses and/or permissions in a system obtained at 341 for users and/or devices. At operation 323, AI service 104 may make predictions or ascertain when such obtained licenses and/or permissions may expire or run out. For example, for a license which is limited to a number of uses by a user, AI service 104 may predict when such license may run out using prior usage data by such user for a feature associated with such license. However, a license with a date certain sunset or expiration may be obtained by AI service 104.

Along those lines, AI service 104 may be configured to detect if licenses assigned to some user have become stale or inactive, and it can re-assign those licenses to new requests or to active sessions. At operation 324, AI service 104 may send notifications to users whose use of features or device have become inactive or idle. At operation 342, an OS or app 301 may relay such notifications to a user or administrator. Such notification may be to solicit input from a user or administrator as to whether to continue or if they can relay the use of their license or permission to other users or system sessions that may be positioned to use same.

At operation 343, administrator or system overrides may be enforced, as applicable, by an OS or app 301. An administrator may act upon a notification to restrict licenses or permissions, re-assign licenses or permissions explicitly or manually, or obtain or purchase additional licenses or permissions. This action can then be relayed back to AI service 104 or driver DSS 102.

In this example, AI service 104 at operation 325 from enforcement operation 343 may enforce and record user and administrator actions to extend, reallocate, override, terminate, and other applicable actions on associated licenses or permissions. However, in another example, a driver DSS 102 may perform operation 325.

AI service 104 may factor how such licensing or permission data influences a driver DSS 102 on creation or update of a dynamic UI. Reallocation at operation 325 may be relayed to driver DSS 102 at operation 312 to create or update a user's dynamic UI.

FIG. 3-2 is a flow diagram depicting an example of a DSS firmware flow 350. As print jobs may be scheduled by a job schedule 351, dynamic scheduling of such print jobs may be performed using a printer DSS 103. Accordingly, DSS firmware flow 350 is further described with simultaneous reference to FIGS. 1-1 through 3-2.

At operation 352, print jobs may be received. By print jobs, it is generally meant operations of MFP 151 or other printing devices involving use of a raster-image processor ("RIP") or another image processing unit. An RIP may be an image processing service included in firmware service 105 of MFP 151.

At operation 353, print jobs are sent to an RIP for interpretation and processing. However, from operation 353, at operation 361 firmware service 105 may receive a print job. At operation 362, firmware service 105 may parse or interpret a print job, as is known.

However, at operation 363, firmware service 105 may be configured to determine whether dynamic scheduling for a print job is present. At operation 364, firmware service 105 may determine whether dynamic scheduling, if present, is activated for such a print job. If at operation 364 it is determined that dynamic scheduling is either not present or present but not activated, then firmware service 105 may generate an image for printing at operation 365. Further at operation 365, firmware service 105 may cause MFP 151 to print such generated image to a print medium, such as a sheet good for example. Examples of sheet goods include paper, plastic laminate, and other types of sheet goods.

If, however, at operation 364 it is determined that dynamic scheduling is or has been activated for a print job, then at operation 372 a printer DSS 103 ignores features and/or settings designated as deactivated or hidden, as indicated in DS data associated with such print job's user. In other words, a user does not have access to such features and/or settings during a time period in which such print job is to be executed. Printer DSS 103 informs firmware service 105 to ignore such features and/or settings in generation of an image to print at operation 365.

Because one or more of the examples described herein may be implemented in using an information processing system, a detailed description of examples of each of a network (such as for a Cloud-based SaaS implementation), a computing system, a mobile device, and an MFP is provided. However, it should be understood that other configurations of one or more of these examples may benefit from the technology described herein.

Figure 4:
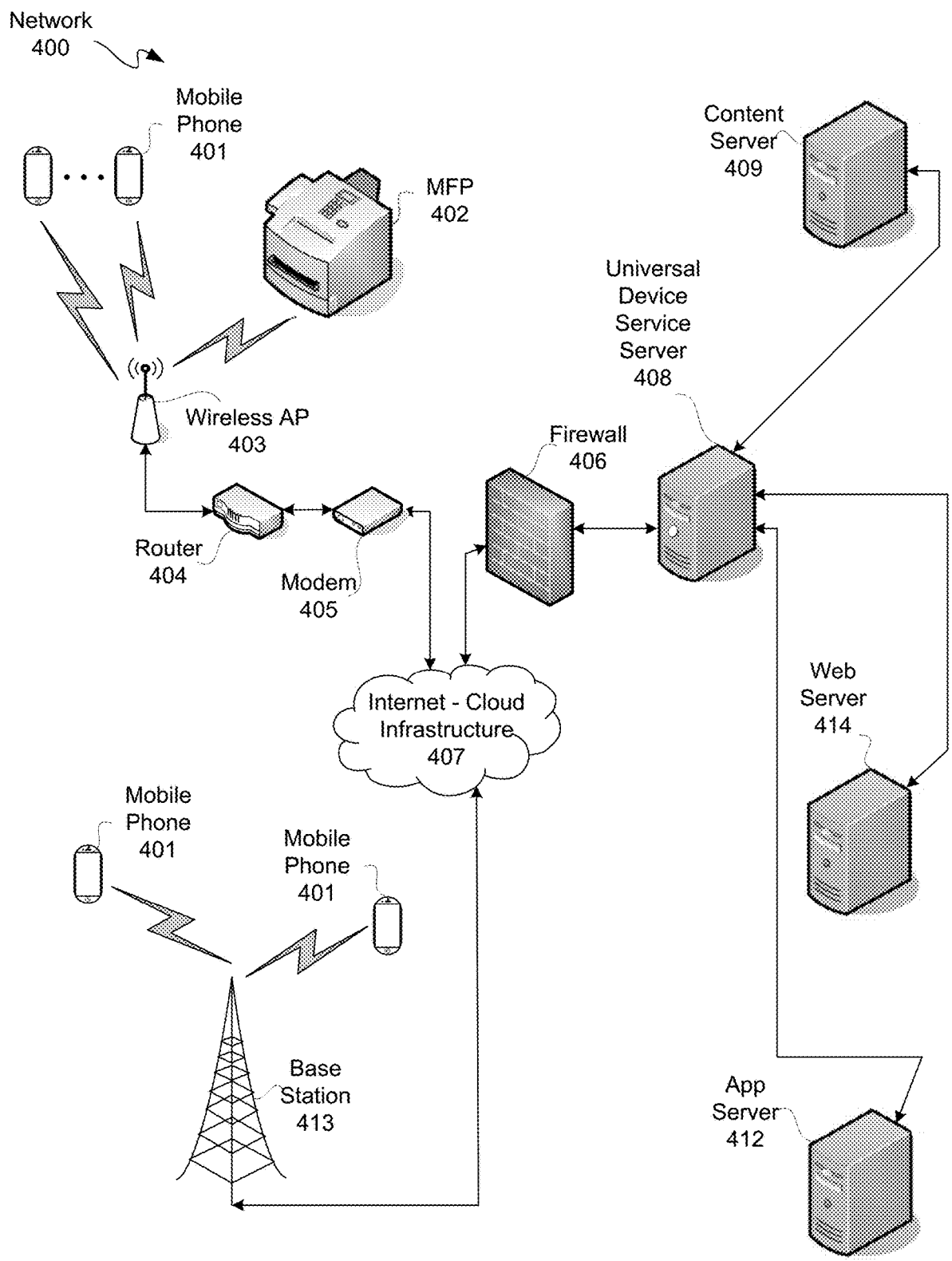
FIG. 4 is a pictorial diagram depicting an example of a network.

FIG. 4 is a pictorial diagram depicting an example of a network 400, which may be used to provide a SaaS platform for hosting a service or micro service for use by a user device, as described herein. Along those lines, network 400 may include one or more mobile phones, pads/tablets, notebooks, and/or other web-usable devices 401 in wired and/or wireless communication with a wired and/or wireless access point ("AP") 403 connected to or of a wireless router. Furthermore, one or more of such web-usable wireless devices 401, such as mobile phones, tablets, notebooks, and/or other such device, may be in wireless communication with a base station 413. Additionally, a desktop computer and/or a printing device, such as for example a multi-function printer ("MFP") 402, each of which may be web-usable devices, may be in wireless and/or wired communication to and from router 404.

Wireless AP 403 may be connected for communication with a router 404, which in turn may be connected to a modem 405. Modem 405 and base station 413 may be in communication with an Internet-Cloud infrastructure 407, which may include public and/or private networks.

A firewall 406 may be in communication with such an Internet-Cloud infrastructure 407. Firewall 406 may be in communication with a universal device service server 408. Universal device service server 408 may be in communication with a content server 409, a web server 414, and/or an app server 412. App server 412, as well as a network 400, may be used for downloading an app or one or more components thereof for accessing and using a service or a micro service as described herein.

Figure 5:
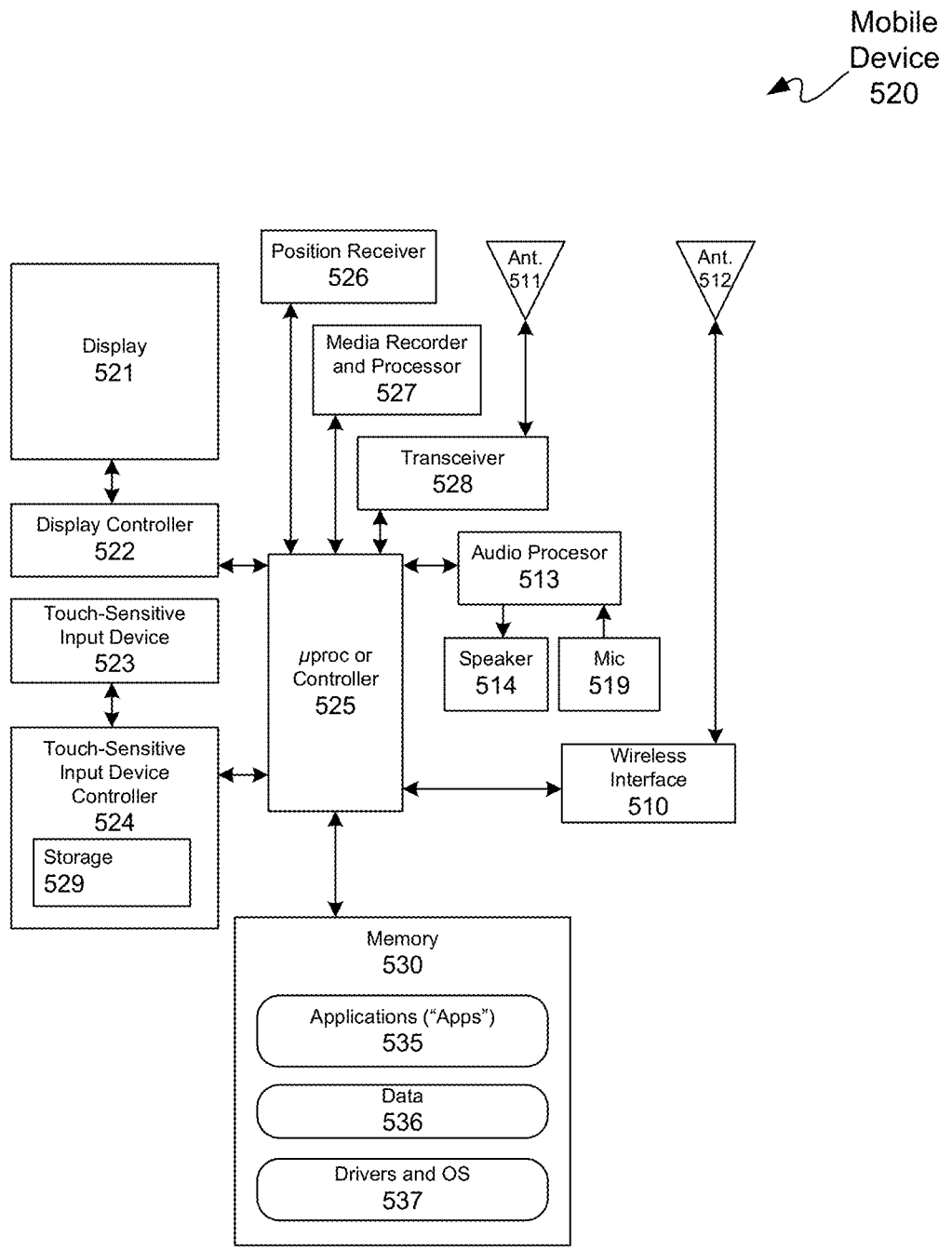
FIG. 5 is block diagram depicting an example of a portable communication device.

FIG. 5 is block diagram depicting an example of a portable communication device ("mobile device") 520. Mobile device 520 may be an example of a mobile device, as previously described.

Mobile device 520 may include a wireless interface 510, an antenna 511, an antenna 512, an audio processor 513, a speaker 514, and a microphone ("mic") 519, a display 521, a display controller 522, a touch-sensitive input device 523, a touch-sensitive input device controller 524, a microprocessor or microcontroller 525, a position receiver 526, a media recorder and processor 527, a cell transceiver 528, and a memory or memories ("memory") 530.

Microprocessor or microcontroller 525 may be programmed to control overall operation of mobile device 520. Microprocessor or microcontroller 525 may include a commercially available or custom microprocessor or microcontroller.

Memory 530 may be interconnected for communication with microprocessor or microcontroller 525 for storing programs and data used by mobile device 520. Memory 530 generally represents an overall hierarchy of memory devices containing software and data used to implement functions of mobile device 520. Data and programs or apps as described hereinabove may be stored in memory 530.

Memory 530 may include, for example, RAM or other volatile solid-state memory, flash or other non-volatile solid-state memory, a magnetic storage medium such as a hard disk drive, a removable storage media, or other suitable storage means. In addition to handling voice communications, mobile device 520 may be configured to transmit, receive and process data, such as Web data communicated to and from a Web server, text messages (also known as short message service or SMS), electronic mail messages, multimedia messages (also known as MMS), image files, video files, audio files, ring tones, streaming audio, streaming video, data feeds (e.g., podcasts), and so forth.

In this example, memory 530 stores drivers, such as I/O device drivers, and operating system programs ("OS") 537. Memory 530 stores application programs ("apps") 535 and data 536. Data may include application program data.

I/O device drivers may include software routines accessed through microprocessor or microcontroller 525 or by an OS stored in memory 530. Apps, to communicate with devices such as the touch-sensitive input device 523 and keys and other user interface objects adaptively displayed on a display 521, may use one or more of such drivers.

Mobile device 520, such as a mobile or cell phone, includes a display 521. Display 521 may be operatively coupled to and controlled by a display controller 522, which may be a suitable microcontroller or microprocessor programmed with a driver for operating display 521.

Touch-sensitive input device 523 may be operatively coupled to and controlled by a touch-sensitive input device controller 524, which may be a suitable microcontroller or microprocessor. Along those lines, touching activity input via touch-sensitive input device 523 may be communicated to touch-sensitive input device controller 524. Touch-sensitive input device controller 524 may optionally include local storage 529.

Touch-sensitive input device controller 524 may be programmed with a driver or application program interface ("API") for apps 535. An app may be associated with a service, as previously described herein, for use of a SaaS. One or more aspects of above-described apps may operate in a foreground or background mode.

Microprocessor or microcontroller 525 may be programmed to interface directly touch-sensitive input device 523 or through touch-sensitive input device controller 524. Microprocessor or microcontroller 525 may be programmed or otherwise configured to interface with one or more other interface device(s) of mobile device 520. Microprocessor or microcontroller 525 may be interconnected for interfacing with a transmitter/receiver ("transceiver") 528, audio processing circuitry, such as an audio processor 513, and a position receiver 526, such as a global positioning system ("GPS") receiver. An antenna 511 may be coupled to transceiver 528 for bi-directional communication, such as cellular and/or satellite communication.

Mobile device 520 may include a media recorder and processor 527, such as a still camera, a video camera, an audio recorder, or the like, to capture digital pictures, audio and/or video. Microprocessor or microcontroller 525 may be interconnected for interfacing with media recorder and processor 527. Image, audio and/or video files corresponding to the pictures, songs and/or video may be stored in memory 530 as data 536.

Mobile device 520 may include an audio processor 513 for processing audio signals, such as for example audio information transmitted by and received from transceiver 528. Microprocessor or microcontroller 525 may be interconnected for interfacing with audio processor 513. Coupled to audio processor 513 may be one or more speakers 514 and one or more microphones 519, for projecting and receiving sound, including without limitation recording sound, via mobile device 520. Audio data may be passed to audio processor 513 for playback. Audio data may include, for example, audio data from an audio file stored in memory 530 as data 536 and retrieved by microprocessor or microcontroller 525. Audio processor 513 may include buffers, decoders, amplifiers and the like.

Mobile device 520 may include one or more local wireless interfaces 510, such as a WIFI interface, an infrared transceiver, and/or an RF adapter. Wireless interface 510 may provide a Bluetooth adapter, a WLAN adapter, an Ultra-Wideband ("UWB") adapter, and/or the like. Wireless interface 510 may be interconnected to an antenna 512 for communication. As is known, a wireless interface 510 may be used with an accessory, such as for example a hands-free adapter and/or a headset. For example, audible output sound corresponding to audio data may be transferred from mobile device 520 to an adapter, another mobile radio terminal, a computer, or another electronic device. In another example, wireless interface 510 may be for communication within a cellular network or another Wireless Wide-Area Network (WWAN).

Figure 6:
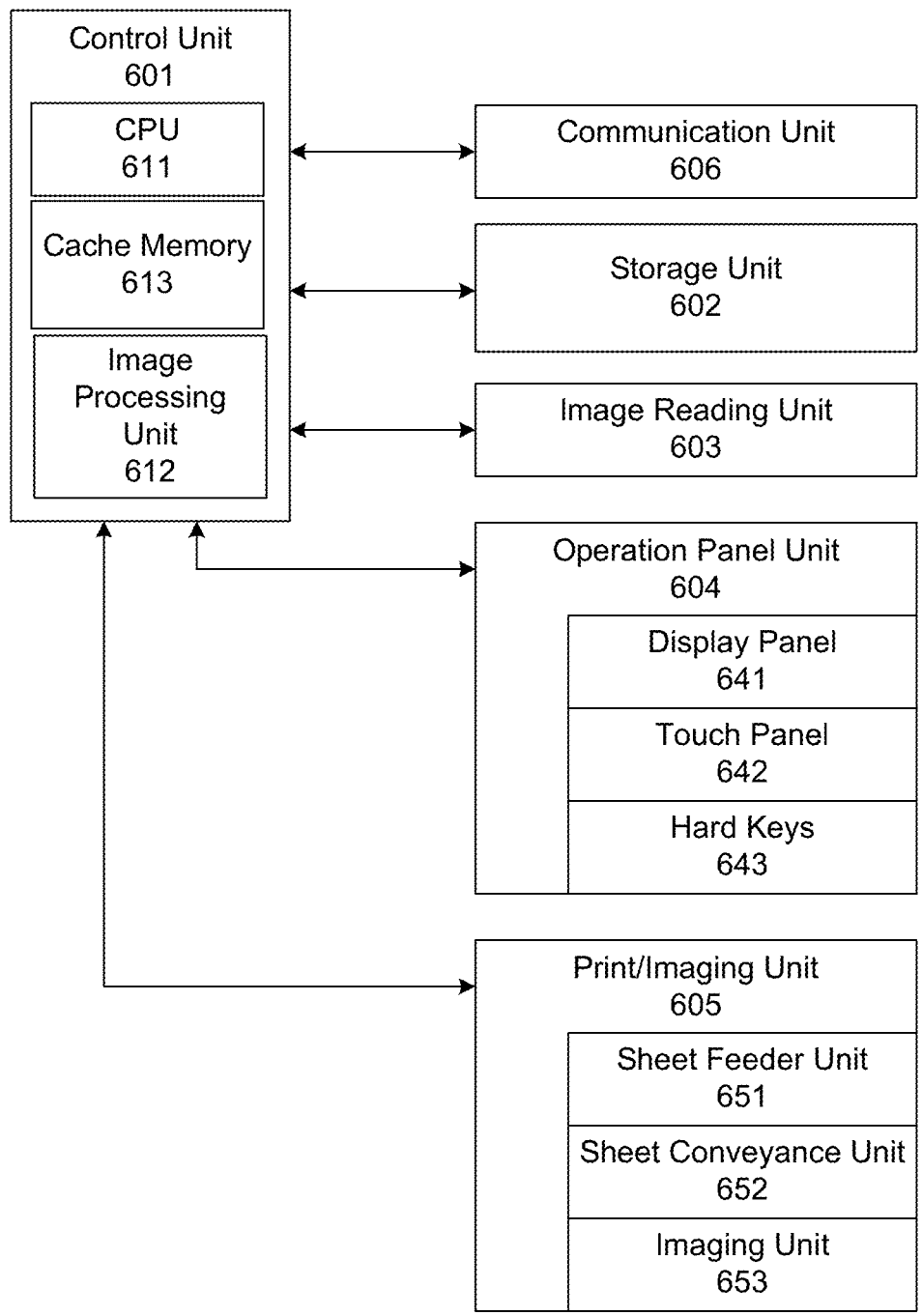
FIG. 6 is a block diagram depicting an example of a multi-function printer.

FIG. 6 is a block diagram depicting an example of an MFP 600. MFP 600 is provided for purposes of clarity by way of non-limiting example. MFP 600 is an example of an information processing system such as for handling a printer job as previously described. MFP 600 may be an example of an MFP 151 of FIG. 1-2.

MFP 600 includes a control unit 601, a storage unit 602, an image reading unit 603, an operation panel unit 604, a print/imaging unit 605, and a communication unit 606. Communication unit 606 may be coupled to a network for communication with other peripherals, mobile devices, computers, servers, and/or other electronic devices.

Control unit 601 may include a CPU 611, an image processing unit 612, and cache memory 613. Control unit 601 may be included with or separate from other components of MFP 600. Storage unit 602 may include ROM, RAM, and large capacity storage memory, such as for example an HDD or an SSD. Storage unit 602 may store various types of data and control programs, including without limitation any printer resident printer driver components. A buffer queue may be located in cache memory 613 or storage unit 602. Storage unit 602 may store a GUI library or database.

Operation panel unit 604 may include a display panel 641, a touch panel 642, and hard keys 643. Print/imaging unit 605 may include a sheet feeder unit 651, a sheet conveyance unit 652, and an imaging unit 653.

Generally, for example, for an MFP a copy image processing unit, a scanner image processing unit, and a printer image processing unit may all be coupled to respective direct memory access controllers for communication with a memory controller for communication with a memory. Many known details regarding MFP 600 are not described for purposes of clarity and not limitation.

Figure 7:
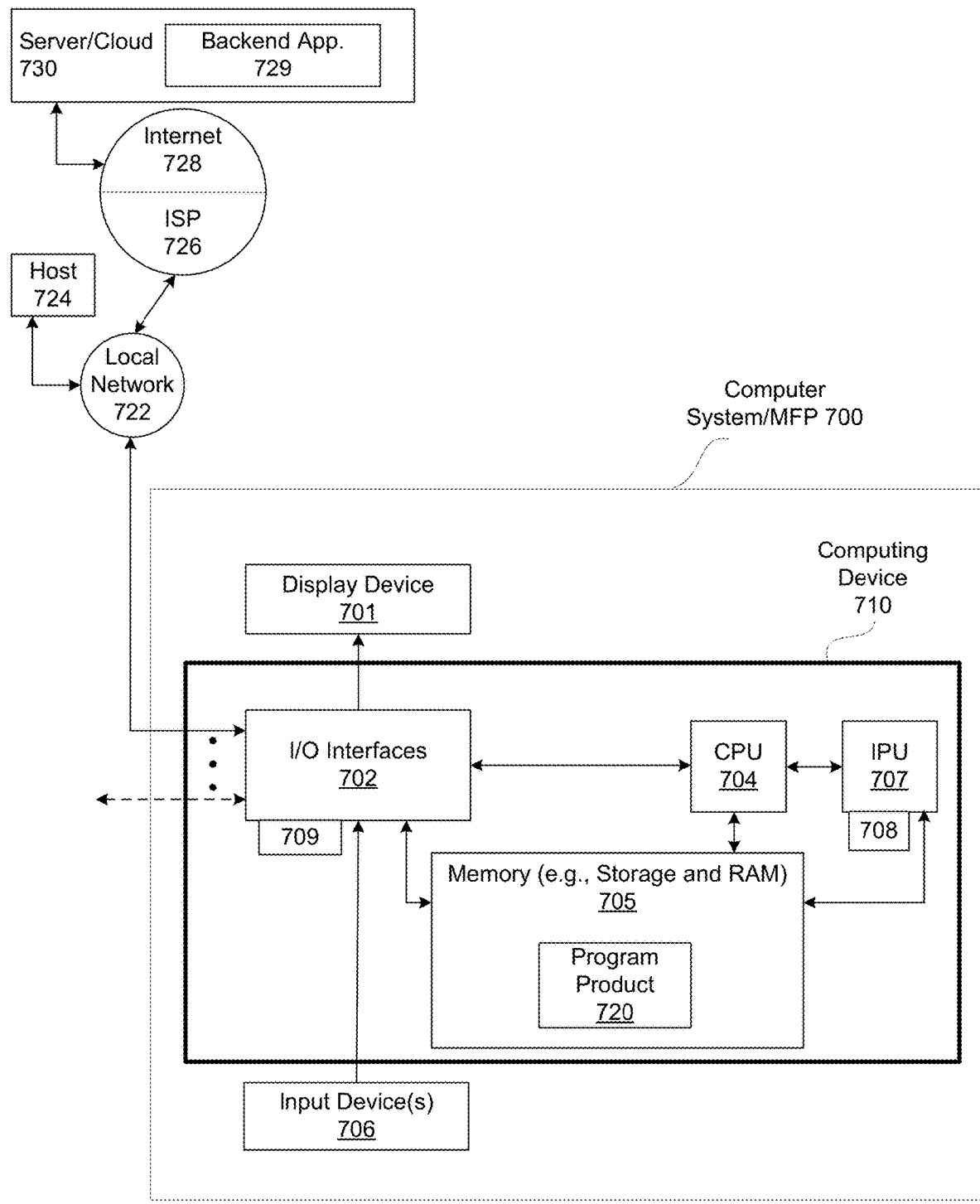
FIG. 7 is a block diagram depicting an example of a computer system.

FIG. 7 is a block diagram depicting an example of a computer system 700 upon which one or more aspects described herein may be implemented. Computer system 700 may include a programmed computing device 710 coupled to one or more display devices 701, such as Cathode Ray Tube ("CRT") displays, plasma displays, Liquid Crystal Displays ("LCDs"), Light Emitting Diode ("LED") displays, light emitting polymer displays ("LPDs") projectors and to one or more input devices 706, such as a keyboard and a cursor pointing device. Other known configurations of a computer system may be used. Computer system 700 may be of an MFP. Computer system 700 by itself or networked with one or more other computer systems 700 may provide an information handling/processing system.

Programmed computing device 710 may be programmed with a suitable operating system, which may include Mac OS, Java Virtual Machine, Real-Time OS Linux, Solaris, iOS, Darwin, Android Linux-based OS, Linux, OS-X, UNIX, or a Windows operating system, among other platforms, including without limitation an embedded operating system, such as VxWorks. Programmed computing device 710 includes a central processing unit ("CPU") 704, one or more memories and/or storage devices ("memory") 705, and one or more input/output ("I/O") interfaces ("I/O interface") 702. Programmed computing device 710 may optionally include an image processing unit ("IPU") 707 coupled to CPU 704 and one or more peripheral cards 709 coupled to I/O interface 702. Along those lines, programmed computing device 710 may include graphics memory 708 coupled to optional IPU 707.

CPU 704 may be a type of microprocessor known in the art, such as available from IBM, Intel, ARM, and Advanced Micro Devices for example. CPU 704 may include one or more processing cores. Support circuits (not shown) may include busses, cache, power supplies, clock circuits, data registers, and the like.

Memory 705 may be directly coupled to CPU 704 or coupled through I/O interface 702. At least a portion of an operating system may be disposed in memory 705. Memory 705 may include one or more of the following: flash memory, random access memory, read only memory, magneto-resistive read/write memory, optical read/write memory, cache memory, magnetic read/write memory, and the like, as well as non-transitory signal-bearing media as described below. For example, memory 705 may include an SSD, which is coupled to I/O interface 702, such as through an NVMe-PCIe bus, SATA bus or other bus. Moreover, one or more SSDs may be used, such as for NVMe, RAID or other multiple drive storage for example.

I/O interface 702 may include chip set chips, graphics processors, and/or daughter cards, among other known circuits. In this example, I/O interface 702 may be a Platform Controller Hub ("PCH"). I/O interface 702 may be coupled to a conventional keyboard, network, mouse, camera, microphone, display printer, and interface circuitry adapted to receive and transmit data, such as data files and the like.

Programmed computing device 710 may optionally include one or more peripheral cards 709. An example of a daughter or peripheral card may include a network interface card ("NIC"), a display interface card, a modem card, and a Universal Serial Bus ("USB") interface card, among other known circuits. Optionally, one or more of these peripherals may be incorporated into a motherboard hosting CPU 704 and I/O interface 702. Along those lines, IPU 707 may be incorporated into CPU 704 and/or may be of a separate peripheral card.

Programmed computing device 710 may be coupled to a number of client computers, server computers, or any combination thereof via a conventional network infrastructure, such as a company's Intranet and/or the Internet, for example, allowing distributed use. Moreover, a storage device, such as an SSD for example, may be directly coupled to such a network as a network drive, without having to be directly internally or externally coupled to programmed computing device 710. However, for purposes of clarity and not limitation, it shall be assumed that an SSD is housed in programmed computing device 710.

Memory 705 may store all or portions of one or more programs or data, including variables or intermediate information during execution of instructions by CPU 704, to implement processes in accordance with one or more examples hereof to provide program product 720. Program product 720 may be for implementing portions of process flows, as described herein. Additionally, those skilled in the art will appreciate that one or more examples hereof may be implemented in hardware, software, or a combination of hardware and software. Such implementations may include a number of processors or processor cores independently executing various programs, dedicated hardware and/or programmable hardware.

Along those lines, implementations related to use of computing device 710 for implementing techniques described herein may be performed by computing device 710 in response to CPU 704 executing one or more sequences of one or more instructions contained in main memory of memory 705. Such instructions may be read into such main memory from another machine-readable medium, such as a storage device of memory 705. Execution of the sequences of instructions contained in main memory may cause CPU 704 to perform one or more process steps described herein. In alternative implementations, hardwired circuitry may be used in place of or in combination with software instructions for such implementations. Thus, the example implementations described herein should not be considered limited to any specific combination of hardware circuitry and software, unless expressly stated herein otherwise.

One or more program(s) of program product 720, as well as documents thereof, may define functions of examples hereof and can be contained on a variety of non-transitory tangible signal-bearing media, such as computer- or machine-readable media having code, which include, but are not limited to: (i) information permanently stored on non-writable storage media (e.g., read-only memory devices within a computer such as CD-ROM or DVD-ROM disks readable by a CD-ROM drive or a DVD drive); or (ii) alterable information stored on writable storage media (e.g., floppy disks within a diskette drive or flash drive or hard-disk drive or read/writable CD or read/writable DVD).

Computer readable storage media encoded with program code may be packaged with a compatible device or provided separately from other devices. In addition, program code may be encoded and transmitted via wired optical, and/or wireless networks conforming to a variety of protocols, including the Internet, thereby allowing distribution, e.g., via Internet download. In implementations, information downloaded from the Internet and other networks may be used to provide program product 720. Such transitory tangible signal-bearing media, when carrying computer-readable instructions that direct functions hereof, represent implementations hereof.

Along those lines the term "tangible machine-readable medium" or "tangible computer-readable storage" or the like refers to any tangible medium that participates in providing data that causes a machine to operate in a specific manner. In an example implemented using computer system 700, tangible machine-readable media are involved, for example, in providing instructions to CPU 704 for execution as part of programmed product 720. Thus, a programmed computing device 710 may include programmed product 720 embodied in a tangible machine-readable medium. Such a medium may take many forms, including those describe above.

The term "transmission media", which includes coaxial cables, conductive wire and fiber optics, including traces or wires of a bus, may be used in communication of signals, including a carrier wave or any other transmission medium from which a computer can read. Transmission media can also take the form of acoustic or light waves, such as those generated during radio-wave and infra-red data communications.

Various forms of tangible signal-bearing machine-readable media may be involved in carrying one or more sequences of one or more instructions to CPU 704 for execution. For example, instructions may initially be carried on a magnetic disk or other storage media of a remote computer. The remote computer can load the instructions into its dynamic memory and send such instructions over a transmission media using a modem. A modem local to computer system 700 can receive such instructions on such transmission media and use an infra-red transmitter to convert such instructions to an infra-red signal. An infra-red detector can receive such instructions carried in such infra-red signal and appropriate circuitry can place such instructions on a bus of computing device 710 for writing into main memory, from which CPU 704 can retrieve and execute such instructions. Instructions received by main memory may optionally be stored on a storage device either before or after execution by CPU 704.

Computer system 700 may include a communication interface as part of I/O interface 702 coupled to a bus of computing device 710. Such a communication interface may provide a two-way data communication coupling to a network link connected to a local network 722. For example, such a communication interface may be a local area network ("LAN") card to provide a data communication connection to a compatible LAN. Wireless links may also be implemented. In any such implementation, a communication interface sends and receives electrical, electromagnetic or optical signals that carry digital and/or analog data and instructions in streams representing various types of information.

A network link to local network 722 may provide data communication through one or more networks to other data devices. For example, a network link may provide a connection through local network 722 to a host computer 724 or to data equipment operated by an Internet Service Provider ("ISP") 726 or another Internet service provider. ISP 726 may in turn provide data communication services through a world-wide packet data communication network, the "Internet" 728. Local network 722 and the Internet 728 may both use electrical, electromagnetic or optical signals that carry analog and/or digital data streams. Data carrying signals through various networks, which carry data to and from computer system 700, are exemplary forms of carrier waves for transporting information.

Wireless circuitry of I/O interface 702 may be used to send and receive information over a wireless link or network to one or more other devices' conventional circuitry such as an antenna system, an RF transceiver, one or more amplifiers, a tuner, one or more oscillators, a digital signal processor, a CODEC chipset, memory, and the like. In some implementations, wireless circuitry may be capable of establishing and maintaining communications with other devices using one or more communication protocols, including time division multiple access (TDMA), code division multiple access (CDMA), global system for mobile communications (GSM), Enhanced Data GSM Environment (EDGE), wideband code division multiple access (W-CDMA), Long Term Evolution (LTE), LTE-Advanced, WIFI (such as IEEE 802.11a, IEEE 802.11b, IEEE 802.11g and/or IEEE 802.11n), Bluetooth, Wi-MAX, voice over Internet Protocol (VoIP), near field communication protocol (NFC), a protocol for email, instant messaging, and/or a short message service (SMS), or any other suitable communication protocol. A computing device can include wireless circuitry that can communicate over several different types of wireless networks depending on the range required for the communication. For example, a short-range wireless transceiver (e.g., Bluetooth), a medium-range wireless transceiver (e.g., WIFI), and/or a long range wireless transceiver (e.g., GSM/GPRS, UMTS, CDMA2000, EV-DO, and LTE/LTE-Advanced) can be used depending on the type of communication or the range of the communication.

Computer system 700 can send messages and receive data, including program code, through network(s) via a network link and communication interface of I/O interface 702. In the Internet example, a server 730 might transmit a requested code for an application program through Internet 728, ISP 726, local network 722 and I/O interface 702. A server/Cloud-based system 730 may include a backend application 729 for providing one or more applications or services as described herein. Received code may be executed by processor 704 as it is received, and/or stored in a storage device, or other non-volatile storage, of memory 705 for later execution. In this manner, computer system 700 may obtain application code in the form of a carrier wave.

While the foregoing describes exemplary apparatus(es) and/or method(s), other and further examples in accordance with the one or more aspects described herein may be devised without departing from the scope hereof, which is determined by the claims that follow and equivalents thereof. Claims listing steps do not imply any order of the steps. Trademarks are the property of their respective owners.

What is claimed is:

1. A method, comprising:
querying features of a printing device configuration by a firmware service;
packaging the features obtained by a first dynamic scheduling service associated with the printing device;
retrieving the features packaged to provide a features list thereof by a second dynamic scheduling service for a driver associated with the printing device;
generating dynamic scheduling data by an artificial intelligence service including deactivating one or more of the features responsive to a policy;
wherein the generating of the dynamic scheduling data comprises filtering the features using the policy by the artificial intelligence service; and
creating a dynamic user interface by the second dynamic scheduling service responsive to the dynamic scheduling data.

2. The method according to claim 1, further comprising:
saving the dynamic scheduling data by the second dynamic scheduling service; and
saving the dynamic user interface by the first dynamic scheduling service.

3. The method according to claim 2, further comprising:
retrieving the dynamic scheduling data and the dynamic user interface associated therewith by the second dynamic scheduling service; and
updating the dynamic user interface by the second dynamic scheduling service responsive to user modification of the dynamic scheduling data.

4. The method according to claim 3, wherein the dynamic scheduling data is stored in a data structure having a start time field, an end time field, a feature field, an activation state field, and a user account field.

5. The method according to claim 1, wherein at least one of the features include one or more settings therefor.

6. The method according to claim 5, wherein the features are associated with a multi-function printer for the printing device.

7. The method according to claim 1, further comprising:
sending by the second dynamic scheduling service to the artificial intelligence service a request to check for permissions associated with the features;
providing a dynamic list by the artificial intelligence service to the second dynamic scheduling service responsive to the request; and
wherein the providing the dynamic list comprises by the artificial intelligence service:
determining the permissions associated with the features;
analyzing usage data for the features having the permissions;
arranging the features responsive to the permissions and the usage data; and
placing the features arranged into the dynamic list.

8. The method according to claim 7, further comprising:
adjusting a layout of the dynamic user interface by the second dynamic scheduling service responsive to the dynamic list; and
providing an updated version of the dynamic user interface for display.

9. The method according to claim 1, further comprising:
activating the features associated with the printing device by the second dynamic scheduling service;

communicating with the artificial intelligence service by the second dynamic scheduling service to query an operating system for licenses associated with the features;

querying the operating system by the artificial intelligence service for the licenses;

retrieving the licenses by the operating system;

providing the licenses retrieved to the artificial intelligence service;

analyzing the licenses by the artificial intelligence service for a user or the printing device;

predicting by the artificial intelligence service when a license of the licenses terminates responsive to usage data of the user for an associated feature of the features; and sending a notification to the user or an administrator regarding a prediction obtained from the predicting.

10. The method according to claim 9, further comprising reallocating one or more of the licenses to one or more other users by the artificial intelligence service.

11. A system, comprising:
a printing device configured with associated features, a firmware service, and a first dynamic scheduling service;
a server computer having an artificial intelligence service configured for communication with the firmware service and the first dynamic scheduling service;
a client computer having a second dynamic scheduling service configured for communication with the first dynamic scheduling service and the artificial intelligence service; and
wherein:
the first dynamic scheduling service is configured to provide a package of the features;
the second dynamic scheduling service is configured to provide a features list from the package for a driver associated with the printing device;
the artificial intelligence service is configured to generate dynamic scheduling data including deactivating one or more of the features responsive to a policy;
the artificial intelligence service is configured to filter the features based on the policy to generate dynamic scheduling data; and
the second dynamic scheduling service is configured to create a dynamic user interface responsive to the dynamic scheduling data.

12. The system according to claim 11, wherein:
the second dynamic scheduling service is configured to cause the dynamic scheduling data to be stored in network memory; and
the first dynamic scheduling service is configured to cause the dynamic user interface to be stored in the network memory.

13. The system according to claim 12, wherein the second dynamic scheduling service is configured to:
retrieve the dynamic scheduling data and the dynamic user interface associated; and
update the dynamic user interface responsive to user modification of the dynamic scheduling data.

14. The system according to claim 12, wherein the server is configured to communicate the dynamic user interface to a mobile device in communication with the server.

15. A method, comprising:
querying features of a printing device configuration by a firmware service;
packaging the features obtained by a first dynamic scheduling service associated with the printing device;
retrieving the features packaged to provide a features list thereof by a second dynamic scheduling service for a driver associated with the printing device;
generating dynamic scheduling data by an artificial intelligence service including deactivating one or more of the features responsive to a policy;
wherein the generating of the dynamic scheduling data comprises filtering the features based on the policy by the artificial intelligence service; and
determining by the second dynamic scheduling service whether a dynamic user interface is either stored or is to be created from a default layout.

16. The method according to claim 15, wherein responsive to the dynamic user interface being stored, modifying the dynamic user interface with the dynamic scheduling data to provide an updated version thereof.

17. The method according to claim 15, wherein responsive to the dynamic user interface having to be created from the default layout,
querying a default application user interface or a default application launcher by the first dynamic scheduling service in response to the second dynamic scheduling service;
re-querying the features of the printing device configuration by the firmware service in response to the first dynamic scheduling service for the default application user interface or the default application launcher; and
populating the default layout with the dynamic scheduling data using the default application user interface or responsive to the default application launcher locating and activating the default layout for population thereof to provide the dynamic user interface.

18. The method according to claim 17, further comprising:
tracking system time by the second dynamic scheduling service; and
checking with the dynamic scheduling data by the second dynamic scheduling service to determine if a time period is near to an end thereof.

19. The method according to claim 18, further comprising:
providing a notification to a client device indicating the time period is near the end or has expired; and
updating the dynamic scheduling data responsive to a request for more time.

20. The method according to claim 17, further comprising communicating the dynamic user interface to a mobile device in communication with a server hosting the artificial intelligence service.

* * * * *